US012634660B2

(12) United States Patent
Yu et al.

(10) Patent No.: US 12,634,660 B2
(45) Date of Patent: May 19, 2026

(54) UPLINK FEEDBACK METHOD AND APPARATUS

(71) Applicant: HUAWEI TECHNOLOGIES CO., LTD., Shenzhen (CN)

(72) Inventors: Haifeng Yu, Beijing (CN); Bingzhao Li, Beijing (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 442 days.

(21) Appl. No.: 18/178,685

(22) Filed: Mar. 6, 2023

(65) Prior Publication Data

US 2023/0209316 A1     Jun. 29, 2023

Related U.S. Application Data

(63) Continuation of application No. PCT/CN2021/116943, filed on Sep. 7, 2021.

(30) Foreign Application Priority Data

Sep. 8, 2020     (CN) .......................... 202010937389.8

(51) Int. Cl.
*H04W 4/06*          (2009.01)
*H04L 5/00*          (2006.01)
(52) U.S. Cl.
CPC ............. *H04W 4/06* (2013.01); *H04L 5/0053* (2013.01)
(58) Field of Classification Search
None
See application file for complete search history.

(56) References Cited

U.S. PATENT DOCUMENTS

| | | | | |
|---|---|---|---|---|
| 2008/0165717 A1* | 7/2008 | Chen | ..................... | H04W 72/30 |
| | | | | 370/312 |
| 2013/0142072 A1* | 6/2013 | Xu | ......................... | H04W 24/08 |
| | | | | 370/252 |
| 2017/0290014 A1* | 10/2017 | Kim | ......................... | H04W 4/06 |
| 2020/0204329 A1* | 6/2020 | Fujishiro | ............... | H04L 1/1861 |

FOREIGN PATENT DOCUMENTS

| | | |
|---|---|---|
| CN | 102378109 A | 3/2012 |
| CN | 107347177 A | 11/2017 |
| CN | 109155901 A | 1/2019 |

(Continued)

OTHER PUBLICATIONS

Huawei, HiSilicon, Mechanisms to improve reliability for RRC_ Connected Ues. 3GPP TSG RAN WG1 Meeting #103-e, E-meeting, Oct. 26-Nov. 13, 2020, R1-2007563, 4 pages.

(Continued)

*Primary Examiner* — Hong S Cho
(74) *Attorney, Agent, or Firm* — HAUPTMAN HAM, LLP

(57)          ABSTRACT

A communication method includes receiving, by a terminal device, first indication information. The first indication information is useable to indicate to the terminal device to disable a feedback function corresponding to a multimedia broadcast multicast service. The method further comprises disabling, by the terminal device, the feedback function corresponding to the multimedia broadcast multicast service.

16 Claims, 13 Drawing Sheets

(56)           References Cited

FOREIGN PATENT DOCUMENTS

| CN | 111525987 A | 8/2020 |
| WO | 2020223855 A1 | 11/2020 |

OTHER PUBLICATIONS

3GPP TS 38.321 V16.1.0 (Jul. 2020), 3rd Generation Partnership Project; Technical Specification Group Radio Access Network; NR; Medium Access Control (MAC) protocol specification(Release 16), 151 pages.

Moderator (CMCC), Summary#2 on NR Multicast and Broadcast Services. 3GPP TSG RAN WG1 #102-e, e-Meeting, Aug. 17-28, 2020, R1-2007235, 58 pages.

3GPP TS 38.331 V16.1.0 (Jul. 2020), 3rd Generation Partnership Project; Technical Specification Group Radio Access Network; NR; Radio Resource Control (RRC) protocol specification(Release 16), 906 pages.

Convida Wireless, On reliability enhancement for NR multicast and broadcast. 3GPP TSG RAN WG1 #102-e, e-Meeting, Aug. 17-28, 2020, R1-2006632, 3 pages.

Apple: "On Remaining Details of Physical Layer Procedures for NR V2X sidelink", 3GPP Draft; R1-2002327, 3rd Generation Partnership Project (3GPP), Mobile Competence Centre; 650, Route Des Lucioles; F-06921 Sophia-Antipolis Cedex; France; vol. RAN WG1, No. e-Meeting; Apr. 20, 2020-Apr. 30, 2020, [ Apr. 11, 2020]total 7 pages.

Huawei: "[70b#16]—LTE: Mbms enhancements", 3GPP Draft; R2-104868 Summary Ofemail Discussion [70B#16] LTE—MBMS Enhancements, 3rd Generationpartnership Project (3GPP), Mobile Competence Centre ; 650, Route Deslucioles ; F-06921 Sophia-Antipolis Cedex ; France, vol. RAN WG2, No. Madrid, Spain; Aug. 23, 2010-Aug. 27, 2010, Aug. 17, 2010 (Aug. 17, 2010)total 27 pages.

Extended European Search Report issued in corresponding European Application No. 21865966.2, dated Jan. 26, 2024, pp. 1-8.

* cited by examiner

Service: service
G-RNTI: group radio network temporary identifier

SFN: system frame number
SC-MCCH: single cell multicast control channel

SFN: system frame number
MP: modification periodicity
SC-MCCH: single cell multicast control channel SFN: system frame number
SubFrame: subframe
SC-MCCH: single cell multicast control channel
FirstSubFrame: first subframe
Duration: transmission duration Absolute receive time n of
the PDSCH ACK/NACK on PUCCH $K_1$ HARQ feedback
timing indicator Communication
system 100

Network
device 101

Terminal
device 102

Communication system 200

Network device 201

Network device 202

Terminal device 203

Communication system 300

Large tower 301

Small tower 302

Small tower 303

Small tower 304

Terminal device 305

Terminal device

Terminal device

Uplink feedback method 100

| R | F | E | First LCID |
|---|---|---|---|

LCID: logical channel identifier
R: reserved bit
F: quantity of bits corresponding to a
length field of a MAC CE
E: extension indication

| R | R | E | First LCID |
|---|---|---|---|

LCID: logical channel
identifier
R: reserved bit
E: extension indication

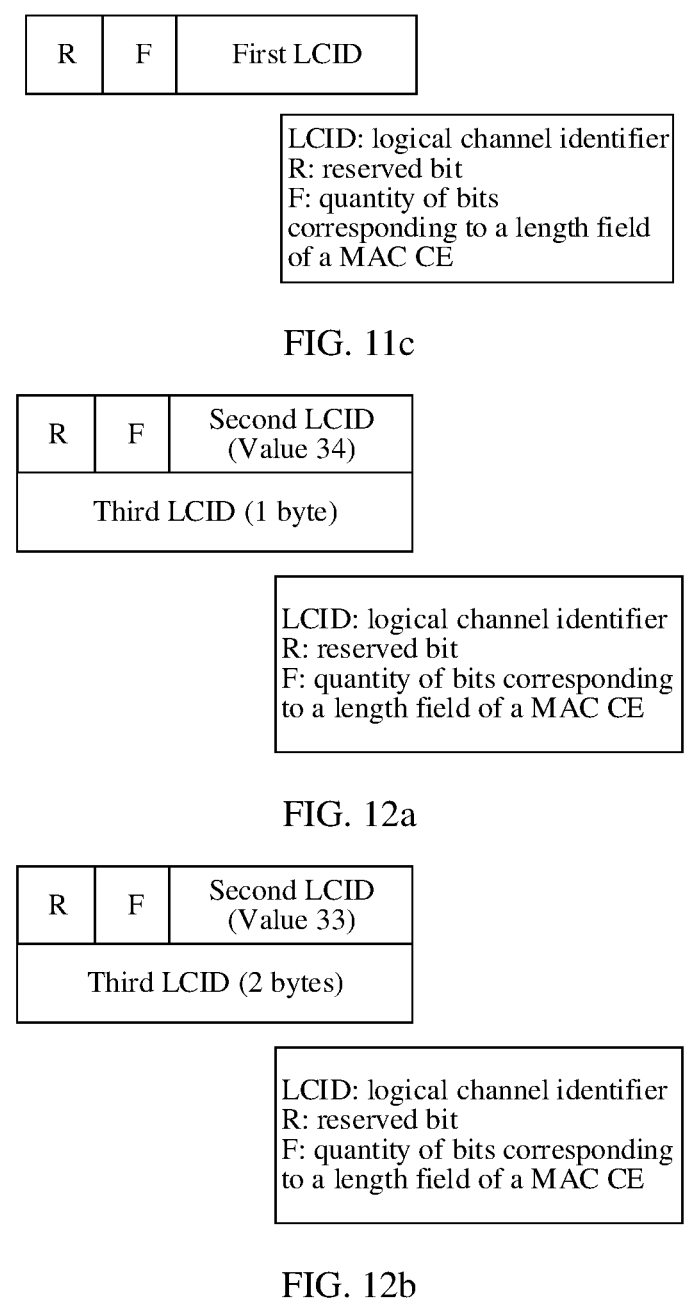

| R | F | First LCID |
|---|---|------------|

LCID: logical channel identifier
R: reserved bit
F: quantity of bits
corresponding to a length field
of a MAC CE

FIG. 11c

| R | F | Second LCID (Value 34) |
|---|---|------------------------|
| Third LCID (1 byte) | | |

LCID: logical channel identifier
R: reserved bit
F: quantity of bits corresponding
to a length field of a MAC CE

FIG. 12a

| R | F | Second LCID (Value 33) |
|---|---|------------------------|
| Third LCID (2 bytes) | | |

LCID: logical channel identifier
R: reserved bit
F: quantity of bits corresponding
to a length field of a MAC CE

FIG. 12b

| MAC subheader | MAC CE (not zero) | |
|---|---|---|
| Quantity of multicast broadcast service identifiers | Multicast broadcast service identifier 1 |
| ... | Multicast broadcast service identifier n |

MAC subheader: multimedia access control subheader
MAC CE: multimedia access control control element

FIG. 13

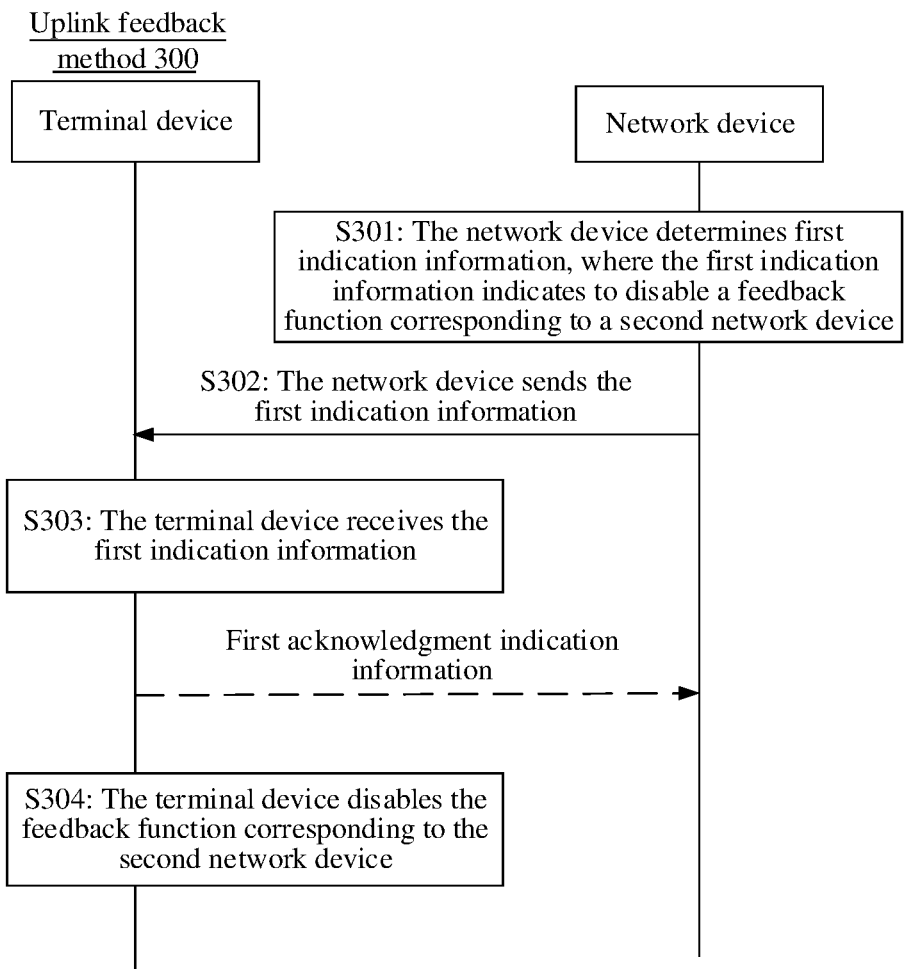

Uplink feedback
method 300

Terminal device

Network device

S301: The network device determines first
indication information, where the first indication
information indicates to disable a feedback
function corresponding to a second network device S302: The network device sends the
first indication information S303: The terminal device receives the
first indication information First acknowledgment indication
information S304: The terminal device disables the
feedback function corresponding to the
second network device

FIG. 17

Uplink feedback
method 400

UPLINK FEEDBACK METHOD AND APPARATUS

CROSS-REFERENCE TO RELATED APPLICATIONS

This application is a continuation of International Application No. PCT/CN2021/116943, filed on Sep. 7, 2021, which claims priority to Chinese Patent Application No. 202010937389.8, filed on Sep. 8, 2020, the disclosures of the aforementioned applications are hereby incorporated by reference in their entireties.

TECHNICAL FIELD

This application relates to the field of communication technologies, and in particular, to an uplink feedback method and an apparatus.

BACKGROUND

User scenarios in which a multimedia broadcast multicast service is applied in a new radio system include a vehicle to everything (vehicle to everything, V2X), an industrial internet of things (Industrial Internet of Things, IIoT), and the like. The user scenarios have a high reliability requirement. However, reliability of the multimedia broadcast multicast service is not considered in a current multicast technology, and feedback for the multimedia broadcast multicast service is not supported. If the current multicast technology is still used in the new radio system such as a future communication system such as 5G, a multicast service with a high reliability requirement cannot be implemented.

Therefore, in the future communication system, how to improve the reliability of the multimedia broadcast multicast service becomes an urgent problem to be resolved.

SUMMARY

One or more embodiments of the present application provide an uplink feedback method and an apparatus, to help improve reliability of a multimedia broadcast multicast service.

According to a first aspect, this application provides an uplink feedback method. The method includes: A terminal device receives first indication information, where the first indication information indicates to disable a feedback function corresponding to a multimedia broadcast multicast service. The terminal device disables the feedback function corresponding to the multimedia broadcast multicast service.

In some embodiments, the first indication information may also be described as follows: The first indication information indicates to close the feedback function corresponding to the multimedia broadcast multicast service.

According to the method, the terminal device can be clearly indicated to close the feedback function corresponding to the multimedia broadcast multicast service, so that in a future communication system, a network device transmits the multimedia broadcast multicast service in a more reliable transmission manner, to improve reliability of the multimedia broadcast multicast service. In addition, according to the method, it can be clearly indicated to close the feedback function corresponding to the multimedia broadcast multicast service. This also helps the network device to transmit the multimedia broadcast multicast service in a corresponding transmission manner based on a reliability requirement of the multimedia broadcast multicast service. Therefore, the method helps improve flexibility of control by the network device.

In some embodiments, after receiving the first indication information, the terminal device may further send first acknowledgment indication information, where the first acknowledgment indication information indicates to acknowledge that the feedback function corresponding to the multimedia broadcast multicast service is disabled or is to be disabled. The feedback function corresponding to the multimedia broadcast multicast service includes one or more of the following: a hybrid automatic repeat request HARQ feedback function, a channel state information CSI feedback function, a channel quality indicator CQI feedback function, a precoding matrix indication PMI feedback function, or a rank indication RI feedback function of an antenna matrix. Therefore, this implementation helps the terminal device negotiate with the network device about the feedback function that is disabled or is to be disabled, and improves flexibility of disabling the feedback function. In addition, this further helps release, in a timely manner, a radio resource that is of the terminal device and that corresponds to the disabled feedback function indicated by the first acknowledgment indication information, to avoid resource waste. In addition, the released part of radio resources may be allocated to another terminal device for use, to improve resource utilization.

In some embodiments, the multimedia broadcast multicast service is received by the terminal device from a second network device when the terminal device communicates with a first network device; or the multimedia broadcast multicast service is received by the terminal device from a second network device when the terminal device performs a unicast operation with a first network device; or the multimedia broadcast multicast service is received by the terminal device from a second network device when the terminal device receives a unicast service from a first network device or sends the unicast service to the first network device. In other words, the uplink feedback method may be applied to a communication scenario in which unicast service transmission is performed between the first network device and the terminal device and multimedia broadcast multicast service transmission is performed between the second network device and the terminal device. Correspondingly, the first indication information indicates to disable or close, during unicast service transmission with the first network device and multimedia broadcast multicast service transmission with the second network device, the feedback function corresponding to the multimedia broadcast multicast service.

In some embodiments, coverage of the second network device is different from that of the first network device, and the coverage of the second network device is large. Therefore, the method helps resolve a problem of limited uplink feedback performed by the terminal device to the second network device when the coverage of the second network device is large.

In addition, in this method, terminal device is clearly indicated to close the feedback function corresponding to the multimedia broadcast multicast service, so as to avoid resource waste caused when the network device blindly configures an uplink feedback resource for the terminal device but the terminal device cannot perform feedback to the second network device due to limited uplink feedback. In addition, a power consumption problem is also avoided, where the problem is caused when the terminal device needs to enable a transmitter to perform uplink feedback but the terminal device still cannot perform successful feedback to the second network device due to limited uplink feedback.

In this embodiment of this application, the first indication information may be from the first network device or the second network device. The first network device may send the first indication information in a unicast manner, or the second network device may send the first indication information in a multicast broadcast manner.

In this embodiment of this application, the first indication information is included in configuration information of the second network device; the first indication information is included in scheduling information of the multimedia broadcast multicast service; the first indication information is included in a system information block SIB from the first network device; or the first indication information is included in radio access control RRC signaling from the first network device. This greatly improves flexibility of sending the first indication information.

In some embodiments, the first indication information includes a feedback indication, and the feedback indication indicates to disable all feedback functions corresponding to the multimedia broadcast multicast service. The feedback indication may be a field. If the field is received from the network device, it indicates that all feedback functions corresponding to the multimedia broadcast multicast service are to be disabled. If the field is not received from the network device, it indicates that all feedback functions corresponding to the multimedia broadcast multicast service are to be enabled. Alternatively, the feedback indication may be one bit. If the bit is 1, it indicates that all feedback functions corresponding to the multimedia broadcast multicast service are to be disabled. If the bit is 0, it indicates that all feedback functions corresponding to the multimedia broadcast multicast service are to be enabled. The field or the bit may be included in the configuration information of the second network device, the scheduling information of the multimedia broadcast multicast service, the system information block SIB from the first network device, or the radio access control RRC signaling from the first network device.

In some embodiments, the first indication information includes a plurality of feedback indications, one feedback indication corresponds to one feedback function, and the feedback indication indicates to disable the corresponding feedback function. In a manner, the feedback indication may be a field. In this way, the first indication information includes a plurality of fields, and each field corresponds to a feedback function. If the first indication information includes a field corresponding to a feedback function, it indicates that the corresponding feedback function is disabled or is to be disabled; or if the first indication information does not include a field corresponding to a feedback function, it indicates that the corresponding feedback function is to be enabled or opened. In another manner, the feedback indication may be a bit. In this way, the first indication information includes a plurality of bits, and each bit corresponds to a feedback function. If a value of a bit that corresponds to a feedback function and that is in the first indication information is 1, it indicates that the corresponding feedback function is disabled or is to be disabled; or if a value of a bit that corresponds to a feedback function and that is in the first indication information is 0, it indicates that the corresponding feedback function is to be enabled or opened. That is, the first indication information indicates, in a bitmap manner, whether to disable the corresponding feedback function.

In some embodiments, the first indication information occupies N bits, and the first indication information indicates, by using $2^N$ states, to disable one or more feedback functions corresponding to the multimedia broadcast multicast service.

In some embodiments, the first indication information further includes one or more service identifiers, and each service identifier corresponds to one service that is in the multimedia broadcast multicast service; and the first indication information indicates to disable a feedback function of the service that corresponds to each service identifier and that is in the multimedia broadcast multicast service. It can be learned that this implementation helps disable feedback functions of some services that are in the multimedia broadcast multicast service, and improves flexibility of disabling the feedback functions.

In some embodiments, the first acknowledgment indication information includes one or more service identifiers, and each service identifier corresponds to one service that is in the multimedia broadcast multicast service; and the first acknowledgment indication information indicates to acknowledge that a feedback function of the service that corresponds to each service identifier and that is in the multimedia broadcast multicast service is disabled or is to be disabled. The service identifier included in the first acknowledgment indication information may be the same as or different from the service identifier included in the first indication information, to help the terminal device and the network device negotiate for determining a service whose feedback function is disabled or is to be disabled, and further improve flexibility of disabling the feedback function.

In this embodiment of this application, the first acknowledgment indication information is carried in a first media access control control element MAC CE, and the first MAC CE includes a preset logical channel identifier LCID value.

According to a second aspect, this application further provides an uplink feedback method. The method corresponds to the first aspect, and is described from a perspective of a network device. The method includes: The network device determines first indication information, where the first indication information indicates to disable a feedback function corresponding to a multimedia broadcast multicast service. The network device sends the first indication information. It can be learned that the network device can clearly indicate a terminal device to close the feedback function corresponding to the multimedia broadcast multicast service, so that in a future communication system, the network device transmits the multimedia broadcast multicast service in a more reliable transmission manner, to improve reliability of the multimedia broadcast multicast service. In addition, the network device can clearly indicate to close the feedback function corresponding to the multimedia broadcast multicast service. This also helps the network device to transmit the multimedia broadcast multicast service in a corresponding transmission manner based on a reliability requirement of the multimedia broadcast multicast service. Therefore, the method helps improve flexibility of control by the network device.

In some embodiments, after sending the first indication information, the network device may further receive first acknowledgment indication information, where the first acknowledgment indication information indicates to acknowledge that the feedback function corresponding to the multimedia broadcast multicast service is disabled or is to be disabled. This implementation helps the terminal device negotiate with the network device about the feedback function that is disabled or is to be disabled, and improves flexibility of disabling the feedback function.

In addition, for another related implementation of the uplink feedback method, refer to the related descriptions of the first aspect. Details are not described herein again.

According to a third aspect, this application further provides an uplink feedback method, and the uplink feedback method is described from a perspective of a terminal device. The method includes: The terminal device receives second indication information, where the second indication information indicates to send feedback information corresponding to a second network device to a first network device. The terminal device sends the feedback information corresponding to the second network device to the first network device.

It can be learned that in the uplink feedback method, the first network device may forward the feedback information corresponding to the second network device, to help resolve a problem of limited uplink feedback performed by the terminal device, and improve reliability of transmitting a downlink service by the second network device. In addition, in this method, the first network device forwards the feedback information corresponding to the second network device to the second network device. This helps improve flexibility of control by the network device.

In some embodiments, after receiving the second indication information, the terminal may further send second acknowledgment indication information, where the second acknowledgment indication information indicates to acknowledge that the feedback information corresponding to the second network device is to be sent to the first network device. This implementation helps notify a network device side that the feedback information forwarded by the first network device is acknowledged, and also helps negotiate with the network device side about which feedback information is forwarded by the first network device.

In some embodiments, the second indication information is from the first network device or the second network device. The second indication information is included in configuration information of the second network device; the second indication information is included in scheduling information of a multimedia broadcast multicast service; the second indication information is included in a system information block SIB from the first network device; or the second indication information is included in radio access control RRC signaling from the first network device. It can be learned that this implementation improves flexibility of sending the second indication information.

In some embodiments, the feedback information corresponding to the second network device includes one or more of the following: hybrid automatic repeat request HARQ information, channel state information CSI, a channel quality indicator CQI, a precoding matrix indication PMI, or a rank indication RI of an antenna matrix.

In some embodiments, the second indication information includes a forwarding indication, where the forwarding indication indicates to send the feedback information corresponding to the second network device to the first network device. The feedback indication may be a field. If the field is received, it indicates that all feedback information corresponding to the second network device is to be sent to the first network device. If the field is not received, it indicates that no feedback information corresponding to the second network device is to be sent to the first network device. Alternatively, the feedback indication may be one bit. If the bit is 1, it indicates that all feedback information corresponding to the second network device is to be sent to the first network device. If the bit is 0, it indicates that no feedback information corresponding to the second network device is to be sent to the first network device. The field or the bit may be included in the configuration information of the second network device, the scheduling information of the multimedia broadcast multicast service, the system information block SIB from the first network device, or the radio access control RRC signaling from the first network device.

In some embodiments, the second indication information includes a plurality of forwarding indications, one forwarding indication corresponds to one piece of feedback information corresponding to the second network device, and the forwarding indication indicates to send the corresponding piece of feedback information to the first network device. In a manner, the feedback indication may be a field. In this way, the second indication information includes a plurality of fields, and each field corresponds to one piece of feedback information. If the second indication information includes a field corresponding to a piece of feedback information, it indicates that the corresponding piece of feedback information to the first network device is to be sent. If the first indication information does not include a field corresponding to a piece of feedback information, it indicates not to send the corresponding piece of feedback information to the first network device. In another manner, the feedback indication may be a bit. In this way, the second indication information includes a plurality of bits, and each bit corresponds to one piece of feedback information. If a value of a bit that corresponds to one piece of feedback information and that is in the second indication information is 1, it indicates that the corresponding piece of feedback information to the first network device is to be sent. If a value of a bit that corresponds to one piece of feedback information and that is in the second indication information is 0, it indicates not to send the corresponding piece of feedback information to the first network device. That is, the second indication information indicates, in a bitmap manner, whether to send the corresponding feedback information to the first network device, so that the first network device forwards the feedback information to the second network device.

In some embodiments, the second indication information occupies N bits, and the second indication information indicates to send, by using $2^N$ states, one or more pieces of corresponding feedback information to the first network device, so that the first network device forwards the feedback information to the second network device.

In some embodiments, the feedback information corresponding to the second network device is feedback information corresponding to the multimedia broadcast multicast service, and the multimedia broadcast multicast service is received from the second network device.

In some embodiments, the second indication information further includes one or more service identifiers, and each service identifier corresponds to one service that is in the multimedia broadcast multicast service; and the second indication information indicates to send feedback information corresponding to one or more services that are in the broadcast multicast service to the first network device. It can be learned that, this implementation helps the first network device forward feedback information of some services that are in the multimedia broadcast multicast service to the second network device, to improve flexibility of feeding back the feedback information of the services that are in the multimedia broadcast multicast service.

In some embodiments, the second acknowledgment indication information includes one or more service identifiers, and each service identifier corresponds to one service that is in the multimedia broadcast multicast service; and the second acknowledgment indication information indicates to acknowledge that feedback information corresponding to one or more services that are in the broadcast multicast service is to be sent to the first network device. The service identifier included in the second acknowledgment indication information may be the same as or different from the service identifier included in the second indication information, to help the terminal device and the network device negotiate for determining a service whose feedback information is to be forwarded by the first network device, and further improve flexibility of feeding back the feedback information.

In this embodiment of this application, the second acknowledgment indication information is carried in a first media access control control element MAC CE, and the first MAC CE includes a preset logical channel identifier LCID value.

In some embodiments, the feedback information that corresponds to the second network device and that is sent by the terminal device includes hybrid automatic repeat request HARQ information, and the HARQ information further includes corresponding HARQ timing information and/or an identifier of the second network device. Therefore, this helps the first network device determine, based on the HARQ timing information and/or the identifier of the second network device, that the HARQ information is to be forwarded to the second network device. The HARQ timing information includes one or more of the following: a feedback timing indicator K1, absolute receive time n of the multimedia broadcast multicast service, or a HARQ process identifier.

In some embodiments, the feedback information includes hybrid automatic repeat request HARQ information. It is indicated, based on one or more of a scrambling identifier of the HARQ information, a physical transmission resource, or a HARQ feedback codebook, that the HARQ information is the feedback information corresponding to the second network device. Therefore, the first network device can learn that the HARQ information is to be forwarded to the second network device.

According to a fourth aspect, this application further provides an uplink feedback method. The uplink feedback method corresponds to the uplink feedback method in the third aspect, and is described from a perspective of a first network device. The method includes: The first network device receives feedback information corresponding to a second network device from a terminal device. The first network device sends the feedback information corresponding to the second network device to the second network device.

It can be learned that, in the uplink feedback method, the first network device sends, to the second network device, the feedback information that is reported by the terminal device and that corresponds to the second network device. This helps resolve a problem of limited uplink feedback performed by the terminal device to the second network device, and improves reliability of transmitting a downlink service by the second network device. In addition, in the method, the first network device may send, to the second network device, the feedback information that is reported by the terminal device and that corresponds to the second network device, to improve flexibility of control by the network device.

In some embodiments, the first network device may send second indication information to the terminal device, where the second indication information indicates the terminal device to send the feedback information corresponding to the second network device to the first network device. It can be learned that, in at least this embodiment, the first network device sends the second indication information to the terminal device, so that different uplink feedback manners are used for different capabilities of the terminal device, to improve flexibility of reporting the feedback information by the terminal device.

In some embodiments, after sending the second indication information, the first network device may further receive second acknowledgment indication information from the terminal device, where the second acknowledgment indication information indicates to acknowledge that the feedback information corresponding to the second network device is to be sent to the first network device. This implementation helps notify the first network device that the terminal device acknowledges the feedback information forwarded by the first network device, and also helps negotiate with a network device side about which feedback information is forwarded by the first network device.

In some embodiments, the feedback information corresponding to the second network device includes one or more of the following: hybrid automatic repeat request HARQ information, channel state information CSI, a channel quality indicator CQI, a precoding matrix indication PMI, or a rank indication RI of an antenna matrix.

For related content of the second indication information or the second acknowledgment indication information in this aspect, refer to related descriptions of the third aspect. Details are not described herein again.

In some embodiments, the first network device determines, based on one or more of a scrambling identifier of feedback information, a physical transmission resource of feedback information, or a bit indication, that the feedback information is the feedback information corresponding to the second network device. The bit indication indicates an identifier of the second network device.

In some embodiments, the first network device determines, based on one or more of a scrambling identifier of the HARQ information, a physical transmission resource of the HARQ information, a HARQ feedback codebook used for the HARQ information, or a bit indication, that the HARQ information from the terminal device needs to be forwarded to the second network device.

When the first network device sends the feedback information to the second network device, in addition to some embodiments in which the first network device directly forwards the feedback information to the second network device, the first network device may alternatively send the HARQ information to the second network device in any one of the following implementations when the HARQ information corresponds to the second network device and corresponds to the multimedia broadcast multicast service from the second network device.

The HARQ information sent by the first network device to the second network device further needs to carry corresponding HARQ timing information. The HARQ timing information may be explicitly carried in the HARQ information fed back by the terminal device, or may be determined by the first network device based on a predefined feedback timing indicator K1.

In some embodiments, the first network device may determine a HARQ information set, and HARQ timing information corresponding to all HARQ information in the HARQ information set is the same. In other words, the first network device may combine HARQ information of same HARQ timing information, to obtain the HARQ information set. Further, the first network device sends the HARQ information set to the second network device.

In some embodiments, the first network device may determine a HARQ information set, and HARQ timing information corresponding to all HARQ information in the HARQ information set is the same. Further, the first network device collects statistics on a quantity of negative NACKs and/or a ratio of the NACKs in the HARQ information set. The first network device sends, to the second network device, the quantity of NACKs and/or the ratio of the NACKs corresponding to the HARQ timing information.

In some embodiments, in addition to sending, to the second network device, a quantity of NACKs and/or a ratio of the NACKs corresponding to the HARQ timing information, the first network device further sends, to the second network device, an identifier that is of a terminal device and that is for each NACK corresponding to the HARQ timing information. Therefore, this helps the second network device learn which terminal devices fail to receive the multimedia broadcast multicast service corresponding to the HARQ timing information.

In some embodiments, the first network device collects statistics on a quantity of negative NACKs and/or a ratio of the NACKs in a HARQ information set. If one of the quantity of negative NACKs and the ratio of the NACKs is not greater than a threshold, the first network device further sends an identifier that is of a terminal device and that is for each NACK corresponding to the HARQ timing information in addition to the quantity of negative NACKs and/or the ratio of the NACKs corresponding to the HARQ timing information. If both the quantity of negative NACKs and the ratio of the NACKs are greater than a threshold, the first network device further sends an identifier that is of a terminal device and that is for each NACK corresponding to the HARQ timing information in addition to the quantity of negative NACKs and/or the ratio of the NACKs corresponding to the HARQ timing information.

In some embodiments, fifth indication information indicates whether to send, to the second network device, an identifier that is of a terminal device and that is for each NACK corresponding to the HARQ timing information. The fifth indication information may be sent by the second network device to the first network device. If the fifth indication information indicates to send, to the second network device, the identifier that is of the terminal device and that is for each NACK corresponding to the HARQ timing information, the first network device sends, to the second network device, a quantity of negative NACKs and/or a ratio of the NACKs corresponding to the HARQ timing information, and the identifier that is of the terminal device and that is for each NACK corresponding to the HARQ timing information. If the fifth indication information indicates not to send, to the second network device, the identifier that is of a terminal device and that is for each NACK corresponding to the HARQ timing information, the first network device sends, to the second network device, a quantity of negative NACKs and/or a ratio of the NACKs corresponding to the HARQ timing information.

The quantity of negative NACKs corresponding to the HARQ timing information in this aspect is a total quantity of negative NACKs in the HARQ information that corresponds to the HARQ timing information and that is received by the first network device. The ratio of the negative NACKs corresponding to the HARQ timing information in this aspect is a ratio of a quantity of all negative NACKs in the HARQ information that corresponds to the HARQ timing information and that is received by the first network device to a sum of a quantity of all acknowledgments ACKs and the quantity of all NACKs.

According to a fifth aspect, this application further provides an uplink feedback method. The method corresponds to the uplink feedback method in the third aspect and the fourth aspect, and is described from a perspective of a second network device. In the uplink feedback method, the second network device receives feedback information that corresponds to the second network device and that is from a first network device, where the feedback information corresponding to the second network device is reported by a terminal device to the first network device. It can be learned that in the method, the second network device may receive the corresponding feedback information from the first network device. This helps resolve a problem of limited uplink feedback performed by the terminal device to the second network device when coverage of the second network device is greater than that of the first network device, and further helps improve reliability of downlink service transmission by the second network device, to improve flexibility of control on a network device side.

In some embodiments, before receiving the feedback information that is from the first network device and that corresponds to the second network device, the second network device further sends a downlink service. The downlink service includes a multimedia broadcast multicast service, and the feedback information corresponds to the multimedia broadcast multicast service.

In some embodiments, before receiving the feedback information that is from the first network device and that corresponds to the second network device, the second network device further sends second indication information to the terminal device, where the second indication information indicates the terminal device to send the feedback information corresponding to the second network device to the first network device. It can be learned that, in at least this embodiment, the second network device sends the second indication information to the terminal device, so that the second network device sends the second indication information in a multicast broadcast manner, to reduce signaling overheads required for sending the second indication information in a unicast manner.

In some embodiments, after sending the second indication information, the second network device may further receive, via the first network device, second acknowledgment indication information from the terminal device, where second acknowledgment indication information indicates to acknowledge that the feedback information corresponding to the second network device is to be sent to the first network device. To be specific, the terminal device may send the second acknowledgment indication information to a corresponding first network device, and each first network device sends the second acknowledgment indication information to the second network device. This implementation helps notify the second network device that the terminal device acknowledges the feedback information forwarded by the first network device, and also helps negotiate with the network device side about which feedback information is forwarded by the first network device.

In some embodiments, the feedback information corresponding to the second network device includes one or more of the following: hybrid automatic repeat request HARQ information, channel state information CSI, a channel quality indicator CQI, a precoding matrix indication PMI, or a rank indication RI of an antenna matrix.

For related content of the second indication information or the second acknowledgment indication information in this aspect, refer to related descriptions of the third aspect. Details are not described herein again.

After receiving the feedback information that is from the first network device and that corresponds to the second network device, the second network device further determines a corresponding retransmission policy for the HARQ information. In addition, that the second network device receives the HARQ information that corresponds to the second network device and that is from the first network device may include but is not limited to one or more implementations. The HARQ information corresponds to the multimedia broadcast multicast service from the second network device.

The HARQ information received by the second network device further needs to carry corresponding HARQ timing information. The HARQ timing information may be explicitly carried in the HARQ information fed back by the terminal device, or may be determined by the first network device based on a predefined feedback timing indicator K1.

In some embodiments, that the second network device receives the HARQ information that corresponds to the second network device and that is from the first network device includes: The second network device starts a statistics window of duration L at time K, where the time K is time at which the second network device sends the multimedia broadcast multicast service or time after the time at which the second network device sends the multimedia broadcast multicast service. The second network device receives a HARQ information set corresponding to the HARQ timing information in the statistics window, where the HARQ timing information corresponding to all HARQ information in the HARQ information set is the same. The HARQ timing information includes one or more of the following: the feedback timing indicator K1, absolute receive time n of the multimedia broadcast multicast service, or a HARQ process identifier.

The HARQ information set corresponding to the HARQ timing information may be from a plurality of first network devices. To be specific, the second network device combines HARQ information sets that correspond to same HARQ timing information and that are from the plurality of first network devices, to obtain the HARQ information set corresponding to the HARQ timing information.

Correspondingly, in at least this embodiment, the second network device further needs to collect, based on the HARQ information set corresponding to the HARQ timing information, statistics on a quantity of negative NACKs and/or a ratio of the NACKs corresponding to the HARQ timing information. A retransmission manner of data corresponding to the HARQ timing information is determined based on the quantity of NACKs and/or the ratio of the NACKs corresponding to the HARQ timing information, where the retransmission manner includes a multicast broadcast manner or a unicast manner.

In some embodiments, that the second network device receives the HARQ information that corresponds to the second network device and that is from the first network device includes: The second network device starts a statistics window of duration L at time K, where the time K is time at which the second network device sends the multimedia broadcast multicast service or time after the time at which the second network device sends the multimedia broadcast multicast service. The second network device receives, in the statistics window, a quantity of negative NACKs and/or a ratio of the NACKs corresponding to the HARQ timing information. The HARQ timing information includes one or more of the following: a feedback timing indicator K1, absolute receive time n of the multimedia broadcast multicast service, or a HARQ process identifier. It can be learned that this implementation helps reduce signaling overheads required for HARQ information feedback.

The quantity of negative NACKs and/or the ratio of the NACKs corresponding to the HARQ timing information may be from a plurality of first network devices. To be specific, the second network device combines quantities of negative NACKs and/or ratios of the NACKs that correspond to the same HARQ timing information and that are from the plurality of first network devices, to obtain the quantity of negative NACKs and/or the ratio of the NACKs corresponding to the HARQ timing information. In this case, the ratio of the NACKs is a ratio of the quantity of NACKs to a sum of a quantity of all acknowledgments ACKs and the quantity of NACKs corresponding to the HARQ timing information.

Correspondingly, in at least this embodiment, the second network device further needs to determine, based on the quantity of NACKs and/or the ratio of the NACKs corresponding to the HARQ timing information, a retransmission manner of data corresponding to the HARQ timing information, where the retransmission manner includes a multicast broadcast manner or a unicast manner.

In some embodiments, in addition to receiving, from the first network device, a quantity of negative NACKs and/or a ratio of the NACKs corresponding to the HARQ timing information, the second network device further receives an identifier that is of a terminal device and that is for each NACK corresponding to the HARQ timing information. Therefore, the second network device learns which terminal devices fail to receive the multimedia broadcast multicast service corresponding to the HARQ timing information.

Correspondingly, in at least this embodiment, the second network device may determine, based on the quantity of NACKs and/or the ratio of the NACKs corresponding to the HARQ timing information, a retransmission manner of data corresponding to the HARQ timing information, where the retransmission manner includes a multicast broadcast manner or a unicast manner. If the retransmission manner of the data corresponding to the HARQ timing information is the multicast broadcast manner, the second network device may send, in the multicast broadcast manner, the data corresponding to the HARQ timing information. If the retransmission manner of the data corresponding to the HARQ timing information is the unicast manner, the second network device may send, in the unicast manner, the data corresponding to the HARQ timing information to the terminal device corresponding to the identifier of the terminal device, or the second network device indicates the first network device to send, in the unicast manner, the data corresponding to the HARQ timing information to the terminal device corresponding to the identifier of the terminal device.

In some embodiments, after the second network device receives, from the first network device, a quantity of negative NACKs and/or a ratio of the NACKs corresponding to the HARQ timing information, the second network device may determine, based on the quantity of negative NACKs and/or the ratio of the NACKs corresponding to the HARQ timing information and one or more thresholds, whether to perform a step of receiving an identifier that is of a terminal device and that is for each NACK corresponding to the HARQ timing information. In one manner, if either of the quantity of negative NACKs and the ratio of the NACKs is not greater than a threshold, the second network device performs the step of receiving the identifier that is of the terminal device and that is for each NACK corresponding to the HARQ timing information; if both the quantity of negative NACKs and the ratio of the NACKs are greater than the threshold, the second network device performs the step of receiving the identifier that is of the terminal device and that is for each NACK corresponding to the HARQ timing information. It can be learned that this implementation helps further reduce signaling overheads required for HARQ information feedback.

Correspondingly, in at least this embodiment, if the second network device performs the step of receiving the identifier that is of the terminal device and that is for each NACK corresponding to the HARQ timing information, the second network device may send, in the unicast manner, the data corresponding to the HARQ timing information to the terminal device corresponding to the identifier of the terminal device, or the second network device indicates the first network device to send, in the unicast manner, the data corresponding to the HARQ timing information to the terminal device corresponding to the identifier of the terminal device. If the second network device does not perform the step of receiving the identifier that is of the terminal device and that is for each NACK corresponding to the HARQ timing information, the second network device may send, in the multicast broadcast manner, the data corresponding to the HARQ timing information.

In some embodiments, the second network device may send fifth indication information, where the fifth indication information indicates the first network device whether to send an identifier that is of a terminal device and that is for each NACK corresponding to the HARQ timing information. If the fifth indication information indicates the first network device to send the identifier that is of the terminal device and that is for each NACK corresponding to the HARQ timing information, the second network device performs a step of receiving the identifier that is of the terminal device and that is for each NACK corresponding to the HARQ timing information; if the fifth indication information indicates the first network device not to send the identifier that is of the terminal device and that is for each NACK corresponding to the HARQ timing information, the second network device does not perform the step of receiving the identifier that is of the terminal device and that is for each NACK corresponding to the HARQ timing information. It can be learned that this implementation helps the second network device flexibly control, based on an available resource of the second network device and the like, whether the first network device forwards the identifier that is of the terminal device and that corresponds to each NACK.

Correspondingly, in at least this embodiment, if the fifth indication information indicates the first network device to send the identifier that is of the terminal device and that is for each NACK corresponding to the HARQ timing information, the second network device may send, in the unicast manner, the data corresponding to the HARQ timing information to the terminal device corresponding to the identifier of the terminal device, or the second network device indicates the first network device to send, in the unicast manner, the data corresponding to the HARQ timing information to the terminal device corresponding to the identifier of the terminal device. If the fifth indication information indicates the first network device not to send the identifier that is of the terminal device and that is for each NACK corresponding to the HARQ timing information, the second network device may send, in the multicast broadcast manner, data corresponding to the HARQ timing information.

The quantity of negative NACKs corresponding to the HARQ timing information in this aspect is a total quantity of negative NACKs in the HARQ information that corresponds to the HARQ timing information and that is received by the second network device. The ratio of the negative NACKs corresponding to the HARQ timing information in this aspect is a ratio of a quantity of all negative NACKs in the HARQ information that corresponds to the HARQ timing information and that is received by the second network device to a sum of a quantity of all acknowledgments ACKs and the quantity of all NACKs.

In some embodiments, a retransmission manner of the data corresponding to the HARQ timing information is determined based on the quantity of NACKs and/or the ratio of the NACKs corresponding to the HARQ timing information, where the retransmission manner includes the multicast broadcast manner or the unicast manner.

According to a sixth aspect, this application provides an uplink feedback method. The method includes: A terminal device receives first indication information, where the first indication information indicates to disable a feedback function corresponding to a second network device. The terminal device disables the feedback function corresponding to the second network device.

In some embodiments, the first indication information may also be described as follows: The first indication information indicates to close the feedback function corresponding to the second network device.

According to the method, the terminal device can be clearly indicated to close the feedback function corresponding to the second network device, so as to resolve a problem of limited uplink feedback performed by the terminal device to the second network device when coverage of the second network device is large. In addition, this helps the second network device transmit a service in a more reliable transmission manner in a future communication system, to improve service transmission reliability. In addition, according to the method, it can be clearly indicated to close a feedback function corresponding to a multimedia broadcast multicast service. This also helps the second network device to transmit the service in a corresponding transmission manner based on a reliability requirement of the multimedia broadcast multicast service. Therefore, the method helps improve flexibility of control by the second network device.

In addition, a difference between the uplink feedback method and that in the first aspect lies in different functions of the first indication information and first acknowledgment indication information. Therefore, for another related implementation of the uplink feedback method, refer to related descriptions of the first aspect. Details are not described herein again.

According to a seventh aspect, this application provides an uplink feedback method. The method corresponds to the sixth aspect and is described from a perspective of a network device. The method includes: The network device determines first indication information, where the first indication information indicates to disable a feedback function corresponding to a second network device. The network device sends the first indication information.

In some embodiments, the first indication information may also be described as follows: The first indication information indicates to close the feedback function corresponding to the second network device.

In the method, the network device can clearly indicate a terminal device to close the feedback function corresponding to the second network device. This helps resolve a problem of limited uplink feedback performed by the terminal device to the second network device when coverage of the second network device is large. In addition, this helps the second network device transmit a service in a more reliable transmission manner in a future communication system, to improve service transmission reliability. In addition, according to the method, it can be clearly indicated to close a feedback function corresponding to a multimedia broadcast multicast service. This also helps the second network device to transmit the service in a corresponding transmission manner based on a reliability requirement of the multimedia broadcast multicast service. Therefore, the method helps improve flexibility of control by the second network device.

In addition, a difference between the uplink feedback method and that in the second aspect lies in different functions of the first indication information and first acknowledgment indication information. Therefore, for another related implementation of the uplink feedback method, refer to related descriptions of the second aspect. Details are not described herein again.

According to an eighth aspect, this application further provides an uplink feedback method, and the uplink feedback method is described from a perspective of a terminal device. The method includes: The terminal device receives third indication information, where the third indication information indicates to disable a feedback function corresponding to a second network device and send feedback information corresponding to the second network device to a first network device. The terminal device disables the feedback function corresponding to the second network device, and sends the feedback information corresponding to the second network device to the first network device. It can be learned that, in the method, the feedback function corresponding to the second network device may be disabled, so as to resolve a problem of limited uplink feedback performed by the terminal device to the second network device, and the first network device may further forward the feedback information corresponding to the second network device, to improve reliability of transmitting a downlink service by the second network device. Therefore, according to the uplink feedback method, flexibility of control on a network device side is improved.

To be specific, in this method, the terminal device determines, based on the third indication information, a processing manner of the feedback information corresponding to the second network device. Correspondingly, the network device side may flexibly indicate, based on a reliability requirement of service transmission, the processing manner of the feedback information corresponding to the second network device, to improve flexibility of control by the network device.

In addition, for the third indication information in the uplink feedback method, refer to related descriptions of the first indication information and the second indication information in the foregoing aspects. Details are not described herein again. For another related implementation of the uplink feedback method, refer to the related descriptions of the third aspect and the sixth aspect. Details are not described herein again.

According to a ninth aspect, this application further provides an uplink feedback method. The uplink feedback method corresponds to the uplink feedback method in the eighth aspect, and is described from a perspective of a first network device. In some embodiments, the first network device may perform the related operations of the first network device in the fourth aspect or the related operations of the network device in the seventh aspect. In the method, the first network device flexibly indicates, based on a reliability requirement of service transmission, a processing manner of feedback information corresponding to a second network device, to improve flexibility of control by the network device.

According to a tenth aspect, this application further provides an uplink feedback method. The uplink feedback method corresponds to the uplink feedback method in the eighth aspect, and is described from a perspective of a second network device. In some embodiments, the second network device may perform the related operations of the second network device in the fifth aspect or the related operations of the network device in the seventh aspect. In the method, the second network device flexibly indicates, based on a reliability requirement of service transmission, a processing manner of feedback information corresponding to the second network device, to improve flexibility of control by the network device.

According to an eleventh aspect, an embodiment of this application further provides a communication apparatus, for example, a terminal device, or the communication apparatus may be a terminal device or an apparatus in the terminal device, or an apparatus that can coordinate with a network device. The communication apparatus has some or all functions of the terminal device in the method according to any one of the first aspect, the third aspect, the sixth aspect, and the eighth aspect. For example, functions of the communication apparatus may include functions in some or all of embodiments of this application, or may include a function of separately implementing any embodiment of this application. The function may be implemented by hardware, or may be implemented by hardware executing corresponding software. The hardware or software includes one or more units or modules corresponding to the foregoing functions.

In a possible design, a structure of the communication apparatus may include a processing unit and a transceiver unit. The processing unit is configured to support the communication apparatus in performing a corresponding function in the method provided in any one of the first aspect, the third aspect, the sixth aspect, and the eighth aspect. The transceiver unit is configured to support communication between the communication apparatus and another device, and the another device may be a network device. The terminal device may further include a storage unit. The storage unit is configured to be coupled to the processing unit and the transceiver unit, and stores program instructions and data that are necessary for the communication apparatus. In some embodiments, the processing unit may be a processor, and the transceiver unit may be a transceiver.

In a specific implementation process, the processor may be configured to perform, for example, but not limited to, baseband related processing; and the transceiver may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more components may be integrated on a same chip. For example, the digital baseband processor may be integrated on a same chip with a plurality of application processors (for example, but not limited to a geometric processor and a multimedia processor). The chip may be referred to as a system-on-a-chip (system-on-a-chip). Whether components are independently disposed on different chips or are integrated and disposed on one or more chips usually depends on specific requirements of a product design. This embodiment of this application imposes no limitation on specific implementations of the foregoing components.

According to a twelfth aspect, an embodiment of this application further provides a communication apparatus. The communication apparatus may be a network device, or the network device may be an apparatus in a terminal device, or an apparatus that can be used together with the terminal device. The communication apparatus can implement some or all functions of the network device in the method example in any one of the second aspect, the fourth aspect, the fifth aspect, the seventh aspect, the ninth aspect, and the tenth aspect. For example, functions of the communication apparatus may include functions in some or all of embodiments of this application, or may include a function of separately implementing any embodiment of this application. The function may be implemented by hardware, or may be implemented by hardware executing corresponding software. The hardware or software includes one or more units or modules corresponding to the foregoing functions.

In a possible design, a structure of the communication apparatus may include a processing unit and a transceiver unit. The processing unit is configured to support the communication apparatus in performing a corresponding function in the method provided in the second aspect. The transceiver unit is configured to support communication between the communication apparatus and another device, and the another device may be a terminal device. The communication apparatus may further include a storage unit. The storage unit is configured to be coupled to the processing unit and the transceiver unit, and stores program instructions and data that are necessary for the communication apparatus. In some embodiments, the processing unit may be a processor, and the transceiver unit may be a transceiver.

In a specific implementation process, the processor may be configured to perform, for example, but not limited to, baseband related processing; and the transceiver may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more components may be integrated on a same chip. For example, the digital baseband processor may be integrated on a same chip with a plurality of application processors (for example, but not limited to a geometric processor and a multimedia processor). The chip may be referred to as a system-on-a-chip (system-on-a-chip). Whether components are independently disposed on different chips or are integrated and disposed on one or more chips usually depends on specific requirements of a product design. This embodiment of this application imposes no limitation on specific implementations of the foregoing components.

According to a thirteenth aspect, this application provides a chip system, and the chip system includes a processor and an interface. The chip system may be deployed in a terminal device. The processor is configured to implement the method according to any one of the first aspect, the third aspect, the sixth aspect, and the eighth aspect, or configured to implement the method via the interface. In a possible design, the chip system further includes a memory, and the memory is configured to store program instructions and data that are necessary for the terminal device. The chip system may include a chip, or may include a chip and another discrete component.

According to a fourteenth aspect, this application provides a chip system, and the chip system includes a processor and an interface. The chip system may be deployed in a network device. The processor is configured to implement the method according to any one of the second aspect, the fourth aspect, the fifth aspect, the seventh aspect, the ninth aspect, and the tenth aspect, or configured to implement the method via the interface. In a possible design, the chip system further includes a memory, and the memory is configured to store program instructions and data that are necessary for the network device. The chip system may include a chip, or may include a chip and another discrete component.

According to a fifteenth aspect, this application provides a computer-readable storage medium, configured to store computer software instructions used by the foregoing terminal device, and the computer software instructions include a program used to perform the method according to any one of the first aspect, the third aspect, the sixth aspect, and the eighth aspect.

According to a sixteenth aspect, this application provides a computer-readable storage medium, configured to store computer software instructions used by the foregoing network device, and the computer software instructions include a program used to perform the method according to any one of the second aspect, the fourth aspect, the fifth aspect, the seventh aspect, the ninth aspect, and the tenth aspect.

According to a seventeenth aspect, this application provides a computer program product including instructions. When the computer program product runs on a computer, the computer is enabled to perform the method according to the first aspect or the second aspect.

According to an eighteenth aspect, this application provides a computer program product including instructions. When the computer program product runs on a computer, the computer is enabled to perform the method according to the first aspect or the second aspect.

According to a nineteenth aspect, this application provides a communication system. The system includes at least one terminal and at least one network device in the foregoing aspects. In another possible design, the system may further include another device that interacts with the terminal or the network device in the solutions provided in this application.

BRIEF DESCRIPTION OF DRAWINGS

FIG. 10 is a schematic diagram of an uplink feedback method according to an embodiment of this application;

FIG. 11a to FIG. 11c are schematic diagrams of a MAC subheader according to an embodiment of this application;

FIG. 12a and FIG. 12b are schematic diagrams of another MAC subheader according to an embodiment of this application;

FIG. 13 is a schematic diagram of a partial structure of a first MAC according to an embodiment of this application;

FIG. 17 is a schematic flowchart of an uplink feedback method 300 according to an embodiment of this application;

DETAILED DESCRIPTION

To facilitate understanding of embodiments disclosed in this application, some concepts in embodiments of this application are first described. Descriptions of these concepts include but are not limited to the following.

1. Multimedia Broadcast Multicast Service (Multimedia Broadcast Multicast Service, MBMS)

An MBMS service is sent by a network device in a broadcast form. Each cell is configured with an MBMS subframe. The MBMS service sent by the network device by using the MBMS subframe may be received by all terminal devices, and the network device does not need to know which terminal devices receive the MBMS service. For terminal devices in a connected state, the network device may initiate statistics collection, to collect statistics on terminal devices that receive the MBMS service or that are interested in the MBMS service.

The MBMS service may be transmitted by using a multimedia broadcast multicast single frequency network (Multimedia Broadcast multicast service single frequency network, MBSFN) technology or a single cell point to multipoint (single cell point to multi-point, SC-PTM) technology.

In the MBSFN technology, one MBSFN area may include a plurality of cells that transmit a same waveform. Because the plurality of cells transmit the same waveform, a receiver of the terminal device may consider the plurality of cells as a large cell that is referred to as the MBSFN area for short. In this way, the terminal device does not receive interference from transmission of a neighboring cell, but also benefits from superposition of signals of the plurality of cells. The MBSFN area may be configured with a plurality of physical multicast channels (physical multicast channels, PMCHs), and each PMCH may carry one MBMS service.

In the SC-PTM technology, a network device transmits a same service to a plurality of terminal devices in a cell, and the plurality of terminal devices may receive the same service by using a same downlink configuration, without a need to establish a separate communication link for each terminal device. The SC-PTM technology introduces two logical channels: a single cell multicast control channel (single cell multicast control channel, SC-MCCH) and a single cell multicast transport channel (single cell multicast transport channel, SC-MTCH). The two logical channels are mapped to a downlink shared channel (downlink shared channel, DL-SCH). Information carried on the SC-MCCH includes a service identifier and time information of receiving the SC-MTCH, and the SC-MTCH is for transmitting service data.

Figure 1:
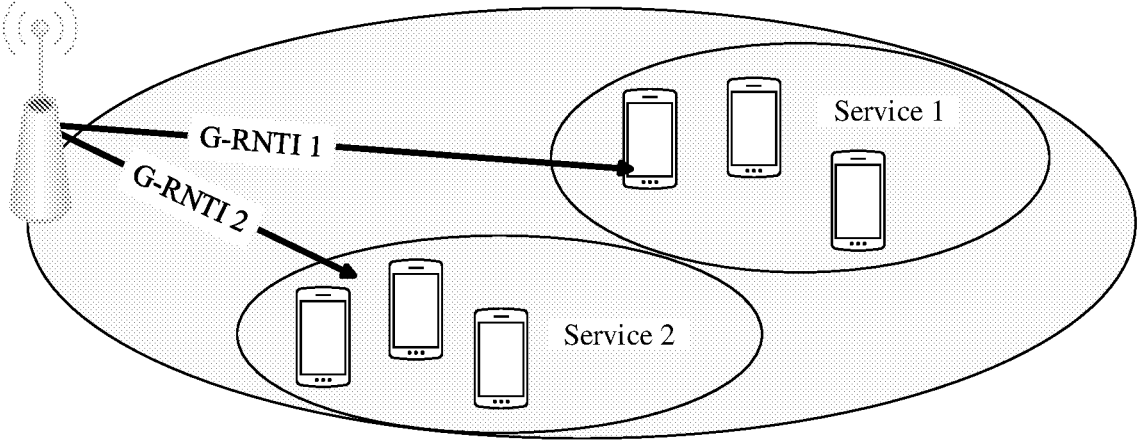
FIG. 1 is a schematic diagram of sending a plurality of multimedia broadcast multicast services by a network device according to an embodiment of this application.

In the SC-PTM technology, the network device schedules, for a plurality of terminal devices in a cell, service data based on a group radio network temporary identifier (group radio network temporary identifier, G-RNTI), and each G-RNTI is associated with one MBMS service. As shown in FIG. 1, the network device schedules service data to a plurality of terminal devices based on a G-RNTI 1 and a G-RNTI 2. The G-RNTI 1 is associated with a service 1 (service 1), and the G-RNTI 2 is associated with a service 2 (service 2). Both the service 1 and the service 2 may be MBMS services.

An operation in which the network device transmits the MBMS service to the terminal device by using the SC-PTM technology may include but is not limited to the following steps: (1) The terminal device receives a system message from the network device. (2) The terminal device receives the SC-MCCH based on the received system message, namely, configuration information of the SC-MCCH. (3) The terminal device receives the MBMS service in the SC-MTCH based on control information transmitted on the SC-MCCH.

The system message includes the control information for transmitting an SC-PTM service, namely, the configuration information of the SC-MCCH. The terminal device determines, based on the configuration information of the SC-MCCH, how to receive the SC-MCCH. The configuration information of the SC-MCCH may include a repetition periodicity (Repetition Periodicity, RP), an SC-MCCH offset (SC-MCCH-offset), SC-MCCH transmission time (SC-MCCH-duration), an SC-MCCH start location (sc-mcch-FirstSubframe), and a modification periodicity (Modification periodicity, MP).

Figure 2:
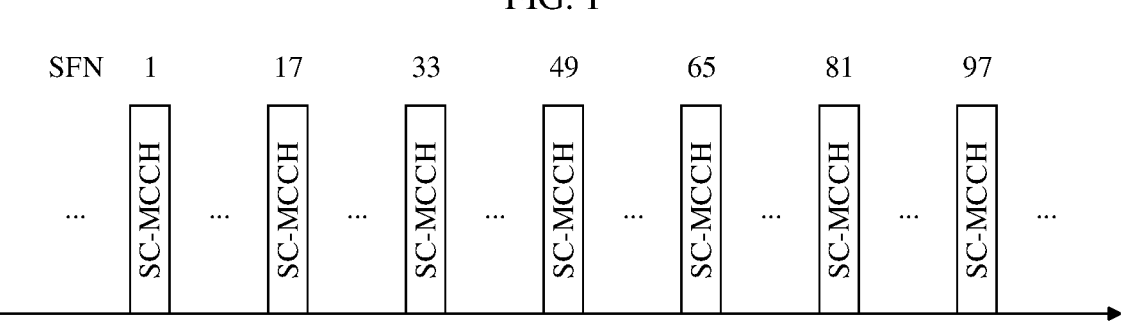
FIG. 2 is a schematic diagram of a system frame in which an SC-MCCH appears according to an embodiment of this application.

The SC-MCCH is transmitted periodically, in other words, one SC-MCCH is sent in one repetition periodicity (Repetition Periodicity, RP). The terminal device determines, based on the RP of the SC-MCCH and SC-MCCH-offset, a boundary at which the SC-MCCH periodically appears, for example, a system frame in which the SC-MCCH appears. A system frame number (system frame number, SFN) of the system frame in which the SC-MCCH appears modulo the RP is equal to SC-MCCH-offset. For example, it is assumed that the RP of the SC-MCCH is a radio frame (radio frame, rf) 16, in other words, the repetition periodicity is equal to 16 radio frames. If SC-MCCH-offset is equal to 1, system frame numbers 1, 17, 33, 49, 65, 81, 97, and the like modulo 16 are equal to 1. In other words, system frames in which the SC-MCCH appears are system frames whose system frame numbers are 1, 17, 33, 49, 65, 81, 97, and the like, as shown in FIG. 2.

Figure 3:
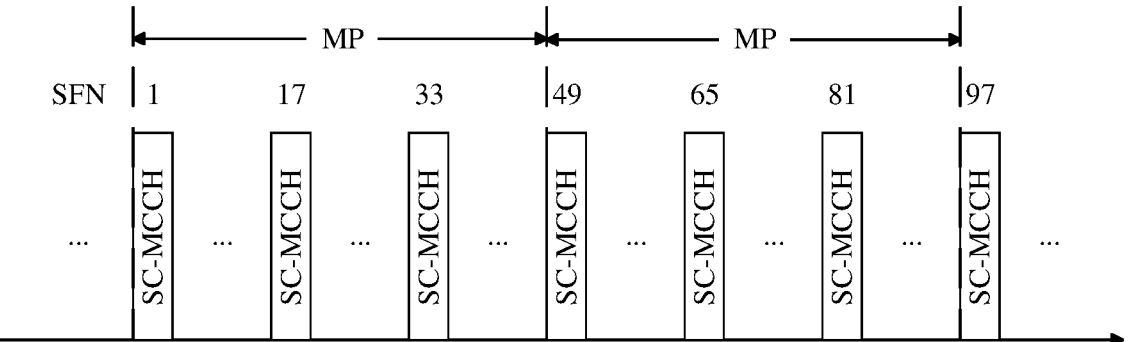
FIG. 3 is a schematic diagram of an MP according to an embodiment of this application.

One MP includes several RPs, and information carried on the SC-MCCH in the MP remains unchanged. If the MP is equal to 48, it indicates that one MP corresponds to 48 system frames. It is assumed that one MP corresponds to 48 system frames, the RP of the SC-MCCH is equal to 16, and SC-MCCH-offset is equal to 1. In this case, FIG. 3 is a schematic diagram of a system frame in which an SC-MCCH appears.

Figure 4:
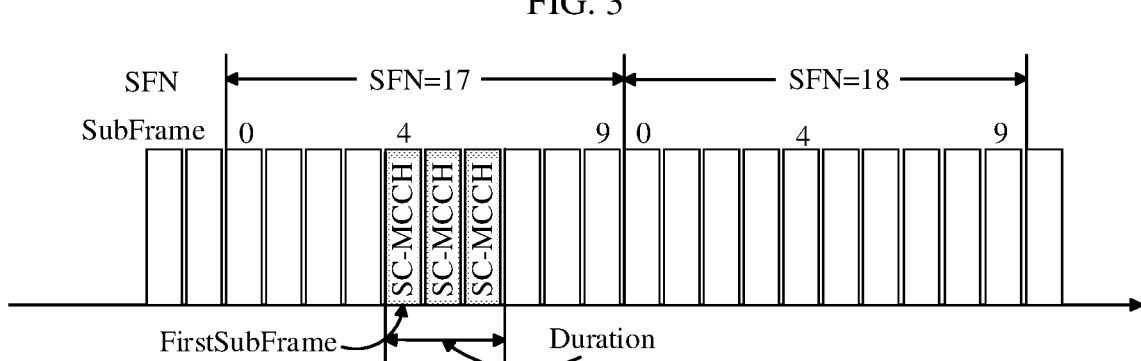
FIG. 4 is a schematic diagram of a subframe in which an SC-MCCH appears according to an embodiment of this application.

SC-MCCH-duration represents SC-MCCH transmission duration, and sc-mcch-FirstSubframe represents the first subframe (which is also referred to as a start subframe location) of the SC-MCCH in the system frame in which the SC-MCCH appears. FIG. 4 is a schematic diagram of the first subframe and transmission duration of an SC-MCCH in a system frame in which the SC-MCCH appears. Assuming that the first subframe (FirstSubFrame) in which an SC-MCCH appears in a system frame numbered 17 is a subframe 4, and transmission duration (Duration) of the SC-MCCH is three subframes, the subframes in which the SC-MCCH appears in the system frame 17 is shown in FIG. 4.

The SC-MCCH periodically transmitted in each MP is the same. If the SC-MCCH changes, a change notification (MCCH change Notification) is transmitted through a physical downlink control channel (physical downlink control channel, PDCCH). A terminal may obtain the change notification by detecting a single cell notification RNTI (Single cell notification RNTI, SC-N-RNTI) on the PDCCH. Further, the terminal may receive the SC-MCCH based on the change notification. In other words, the terminal device may detect the PDCCH scrambled by using the SC-N-RNTI, to obtain scheduling information of the SC-MCCH, and then receive the SC-MCCH.

The control information transmitted on the SC-MCCH includes the configuration information of the SC-MTCH. The configuration information of the SC-MTCH includes multimedia broadcast multicast service session information, for example, a temporary multicast group identifier (Temporary multicast Group Identifier, TMGI), time information (sc-mtch-schedulingInfo) of receiving the SC-MTCH, and a discontinuous reception (discontinuous reception, DRX) parameter. The Session ID is used to receive a group radio network temporary identifier (group radio network temporary identifier, G-RNTI) corresponding to the SC-MTCH. Each G-RNTI can be associated with one MBMS service. A service identifier of the MBMS service may be a TMGI or a G-RNTI.

2. Hybrid Automatic Repeat Request (Hybrid Automatic Repeat Request, HARQ) Information A HARQ is a compromise solution that introduces a forward error correction (Forward Error Correction, FEC) subsystem in an automatic repeat request (automatic retransmission request, ARQ) system. To be specific, within an error correction capability range, the FEC is used for automatic error correction; beyond the error correction capability range, a transmitting end is required for retransmission. Therefore, system reliability and transmission efficiency are improved. For example, after receiving physical downlink shared channel (physical downlink shared channel, PDSCH) transmission, a terminal device determines a HARQ, for example, an acknowledgment (ACK) or a negative acknowledgment (NACK), corresponding to the PDSCH, and sends the HARQ to the network device, so that the network device determines whether the PDSCH needs to be retransmitted.

HARQ feedback timing is determined at two levels. First, an available feedback timing list (d1-datatoUL-ack) is delivered to the terminal device by using RRC signaling. Then, the terminal device selects corresponding feedback timing K1 from the feedback timing list based on a physical downlink shared channel to HARQ feedback timing indicator (PDSCH-to-HARQ_feedback timing indicator) field in DCI. K1 indicated by the PDSCH-to-HARQ_feedback timing indicator field in the DCI indicates that the terminal device feeds back the ACK/NACK in K1 slots after a slot (slot) in which the PDSCH is located. Because a maximum length of the feedback timing list delivered by using the RRC signaling is 8, the PDSCH-to-HARQ_feedback timing indicator field has a maximum of three bits. A value range of the feedback timing K1 in the feedback timing list is 0 to 15, indicating that a maximum time interval between HARQ feedback and PDSCH receiving is 15 slots. In addition, different DCI formats may use different corresponding feedback timing lists. For example, a DCI format Format 1_1 uses a feedback timing list delivered by using the RRC signaling, and a DCI format Format 1_0 uses a fixed feedback timing list, to be specific, feedback timing kl={1, 2, 3, 4, 5, 6, 7, 8} in the feedback timing list.

Figure 5:
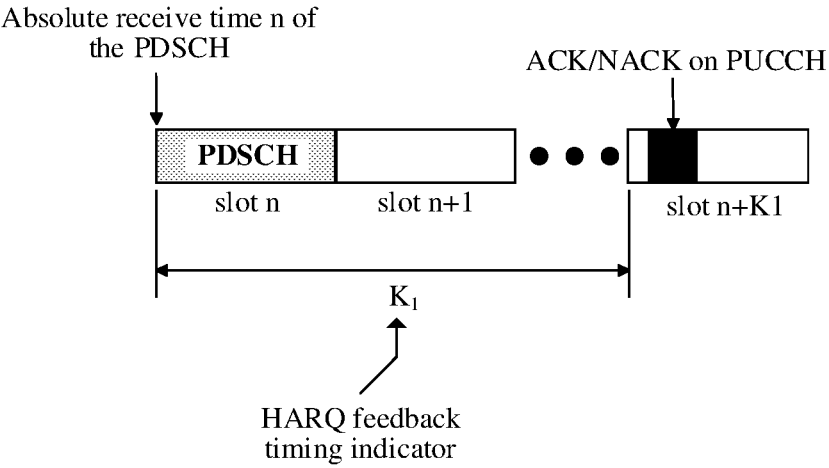
FIG. 5 is a schematic diagram of HARQ feedback according to an embodiment of this application.

In addition, in addition to learning of the feedback timing K1, the terminal device further needs to determine a HARQ feedback occasion based on absolute receive time n of the PDSCH and a HARQ process identifier ID. As shown in FIG. 5, it is assumed that a slot in which the absolute receive time n of the PDSCH is located is a slot n, a slot in which the HARQ feedback occasion is located may be a slot (n+K1). In addition, on the HARQ feedback occasion, the HARQ such as the ACK/NACK is fed back on a physical uplink control channel (physical uplink control channel, PUCCH), and the corresponding HARQ process identifier ID further needs to be fed back.

3. Communication System

This application may be applied to communication systems such as standalone, namely, a new base station, a backhaul link, and a core network that are deployed in a future network, or may be applied to various communication systems such as non-standalone.

For example, the technical solutions in this application may be applied to a 5th generation (5th generation, 5G) system that may also be referred to as a new radio (new radio, NR) system, a 6th generation (6th generation, 6G) system, a 7th generation (7th generation, 7G) system, or another future communication system; or may be further applied to a device to device (device to device, D2D) system, a machine to machine (machine to machine, M2M) system, a long term evolution (long term evolution, LTE) system, a carrier aggregation (carrier aggregation, CA) system, a dual connectivity (Dual Connectivity, DC) technology system, and the like. In a CA or DC scenario, the terminal device may be simultaneously connected to two base stations, and the two base stations may provide services. One or each of the base stations may be an NR base station such as a gNB. One base station may be a master node (master node, MN), and the other base station may provide a service for the terminal device in a manner of secondary carrier addition or secondary base station addition.

Figure 6:
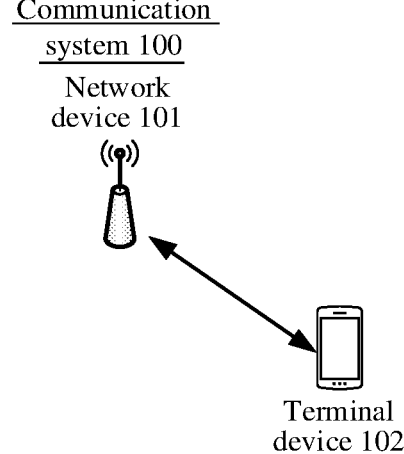
FIG. 6 is a schematic diagram of a communication system 100 according to an embodiment of this application.
Figure 7:
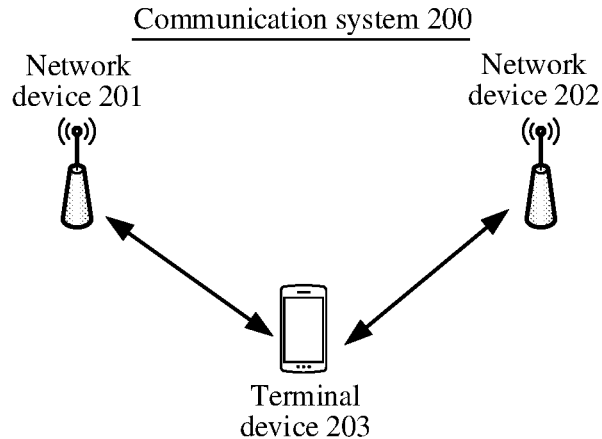
FIG. 7 is a schematic diagram of a communication system 200 according to an embodiment of this application.
Figure 8:
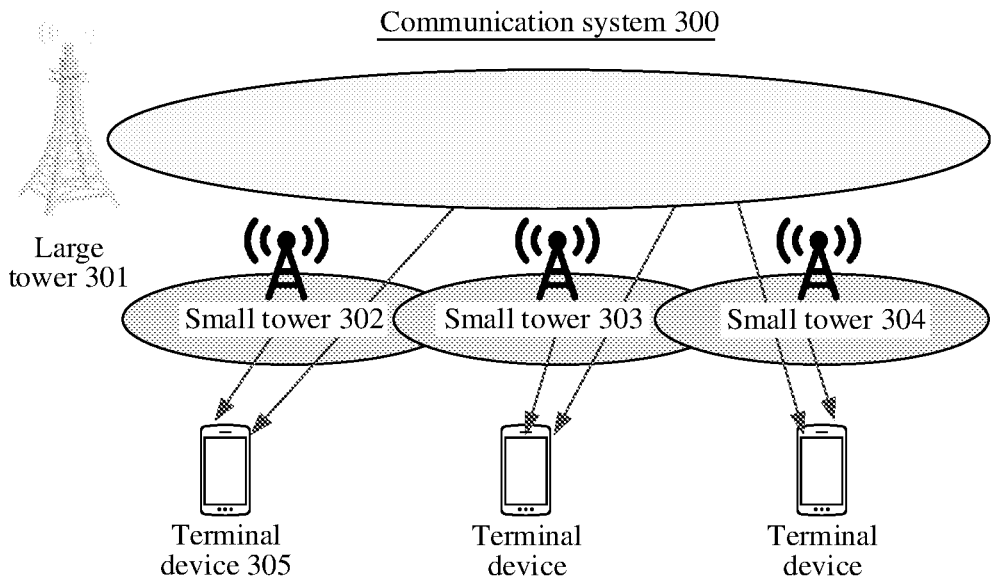
FIG. 8 is a schematic diagram of a communication system 300 according to an embodiment of this application.

By way of example but not limitation, an uplink feedback method in this application may be applied to the communication systems shown in FIG. 6 to FIG. 8. FIG. 6 is a schematic diagram of a scenario of a communication system 100 according to an embodiment of this application. The communication system 100 includes a network device 101 and a terminal device 102. The network device 101 may communicate with the terminal device 102. Certainly, the wireless local area network may further include another device. Quantities and types of devices shown in FIG. 6 are merely examples.

FIG. 7 is a schematic diagram of a scenario of another communication system 200 according to an embodiment of this application. A difference from FIG. 6 lies in that the communication system 200 may include a plurality of network devices (for example, a network device 201 and a network device 202) and one or more terminal devices (for example, a terminal device 203). The plurality of network devices may schedule a same terminal to provide a downlink service for one terminal, or receive an uplink service from one terminal. The network devices may communicate with each other through an Xn interface.

In some embodiments, in the communication system shown in FIG. 7, the network device 202 may add the network device 201 as a secondary carrier or a secondary base station. In addition, the terminal device may send capability information and an interest indication to the network device 202. For example, the capability information may include a capability of receiving a multimedia broadcast multicast service by the terminal device from the network device 201, and the interest indication may include a multimedia broadcast multicast frequency, a multimedia broadcast multicast subcarrier spacing, a multicast bandwidth, and the like that the terminal device is interested in receiving. Further, the network device 202 may determine, based on the capability information and the interest indication that are reported by the terminal device, to add the network device 201 in a CA or DC manner. For example, if the network device 201 can send the multimedia broadcast multicast service, and the capability information reported by the terminal device includes capability information related to multimedia broadcast multicast, for example, the capability of receiving the multimedia broadcast multicast service from the network device 201, the network device 202 may add, in the CA or DC manner, the network device 201 that sends the multimedia broadcast multicast service.

FIG. 8 is a schematic diagram of a scenario of still another communication system 300 according to an embodiment of this application. A difference between the communication system 300 shown in FIG. 8 and the communication system 200 shown in FIG. 7 lies in that, in a process of communicating with a corresponding small tower, a terminal device in coverage of each small tower can further communicate with a large tower. In other words, the large tower may communicate with terminal devices in coverage of a plurality of small towers. For example, in a networking mode shown in FIG. 8, there are terminal devices in coverage of a small tower 302, a small tower 303, and a small tower 304 that communicate with the small towers. The terminal devices in the coverage of the small tower 303 and the small tower 304 are similar to a terminal device 305. In a process of communicating with the corresponding small tower 302, the terminal device 305 can further communicate with a large tower 301. In addition, in this networking mode, the large tower may also communicate with each small tower through an interface between network devices, for example, an Xn interface.

In some embodiments, coverage of the large tower 301 is large, and the coverage of the small tower 302, the small tower 303, and the small tower 304 is small. In addition, when performing a unicast operation with a corresponding small tower, each terminal in FIG. 8 may further receive a multimedia broadcast multicast service from the large tower. This networking mode may be referred to as a deployment method of large tower+small tower interworking (interworking) for short. Interworking indicates that the terminal can further communicate with the large tower in a process of communicating with the small tower. Specifically, the large tower 301 may be, for example, a radio and television tower. Such a high-power large tower has characteristics of wide coverage and a high antenna height. A signal coverage radius of the large tower may reach dozens of kilometers. The small tower may be, for example, a base station with a common function. For ease of description, a common base station is referred to as a small tower in this application.

Correspondingly, in the communication system shown in FIG. 8, the small tower 302 to the small tower 304 may add the large tower 301 as a secondary carrier or a secondary base station. For example, the terminal device 305 sends capability information (for example, a capability of receiving the multimedia broadcast multicast service from the large tower 301) and an interest indication (for example, a multimedia broadcast multicast frequency, a multimedia broadcast multicast subcarrier spacing, and a multimedia broadcast multicast bandwidth that the terminal device is interested in receiving) of the terminal device 305 to the small tower 302. The small tower 302 determines, based on the capability information of the terminal device and the interest indication that are reported by the terminal device, to add the large tower 301 in a CA or DC manner. The large tower 301 may be referred to as a multimedia broadcast multicast service base station.

In embodiments of this application, a network device may be a device that has a wireless transceiver function or a chip that may be disposed in the device. The network device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home network device (for example, a home evolved NodeB, or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission reception point (TRP) or transmission point (TP)), and the like; may be a device used in a 5G system, a 6G system, or even a 7G system, for example, a gNB or a transmission point (TRP or TP) in an NR system, or one antenna panel or a group of (including a plurality of antenna panels) antenna panels of a network device in the 5G system; or may be a network node that constitutes a gNB or a transmission point, for example, a baseband unit (BBU), a distributed unit (distributed unit, DU), or a picocell (Picocell), a femtocell (Femtocell), or a road side unit (road side unit, RSU) in a vehicle to everything (vehicle to everything, V2X) or intelligent driving scenario.

In some deployments, the gNB or the transmission point may include a central unit (central unit, CU), a distributed unit (distributed unit, DU), and the like. The gNB or the transmission point may further include a radio unit (radio unit, RU). The CU implements some functions of the gNB or the transmission point, and the DU implements some functions of the gNB or the transmission point. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer finally becomes information at the physical layer or is transformed from information at the physical layer. Therefore, in such an architecture, it may be considered that higher layer signaling such as RRC layer signaling or PHCP layer signaling is sent by the DU or is sent by the DU and the RU. It may be understood that the network device may be a CU node, a DU node, or a device including a CU node and a DU node.

In addition, the CU may be classified as a network device in a radio access network (radio access network, RAN), namely, an access network device, or the CU may be classified as a network device in a core network (core network, CN), which is referred to as a core network device for short. This is not limited herein. In this embodiment of this application, the core network device corresponds to different devices in different systems. For example, in 4G, the core network device may correspond to a mobility management entity (mobility management entity, MME) and/or a serving gateway (serving gateway, S-GW); in 5G, the core network device may correspond to an Access and Mobility Management Function (AMF), a Session Management Function (SMF), or a User plane Function (UPF).

In embodiments of this application, the terminal device may include but is not limited to user equipment (user equipment, UE), an access terminal, a subscriber unit, a subscriber station, a mobile station, a remote station, a remote terminal, a mobile device, a user terminal, a user agent, a user apparatus, or the like. For another example, the terminal device may be a mobile phone (mobile phone), a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), a wireless terminal in the foregoing vehicle to everything V2X, an RSU of a wireless terminal type, or the like.

In addition, in this embodiment of this application, the first network device may be a small tower, and the second network device may be a large tower. The first network device and the second network device may have a same radio access technology or different radio access technologies. For example, both the first network device and the second network device may be LTE base stations or NR base stations; or one of the first network device and the second network device is an LTE base station, and the other is an NR base station. For another example, the large tower and the small tower may also have a same radio access technology or different radio access technologies.

To clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

This application provides an uplink feedback method, so as to improve transmission reliability of a multimedia broadcast multicast service and flexibility of control by a network device. Specifically, the uplink feedback method in this application includes but is not limited to the following: an uplink feedback method 100 to an uplink feedback method 400.

In the uplink feedback method 100, a terminal device may receive first indication information, where the first indication information indicates to disable a feedback function corresponding to a multimedia broadcast multicast service. The terminal device further disables the feedback function corresponding to the multimedia broadcast multicast service. It can be learned that, according to the method, the feedback function corresponding to the multimedia broadcast multicast service is clearly closed, so that in a future communication system, a network device transmits the multimedia broadcast multicast service in a more reliable transmission manner, to improve reliability of the multimedia broadcast multicast service. For example, for a multimedia broadcast multicast service having a relatively high reliability requirement, the network device may transmit, in a unicast manner, data corresponding to the multimedia broadcast multicast service. In addition, according to the method, it can be clearly indicated to close the feedback function corresponding to the multimedia broadcast multicast service. This also helps the network device to transmit the multimedia broadcast multicast service in a corresponding transmission manner based on a reliability requirement of the multimedia broadcast multicast service. Therefore, the method helps improve flexibility of control by the network device.

This application further provides an uplink feedback method 200. In the uplink feedback method 200, a terminal device may receive second indication information, and the second indication information indicates to send feedback information corresponding to a second network device to a first network device. Further, the terminal device may send the feedback information corresponding to the second network device to the first network device. It can be learned that in the uplink feedback method 200, the first network device may send the feedback information corresponding to the second network device to the second network device, and this helps resolve a problem of limited uplink feedback performed by the terminal device, for example, a problem of limited uplink feedback performed by the terminal device to a large tower in a communication system shown in FIG. 8. Therefore, the second network device can learn of HARQ feedback of a multimedia broadcast multicast service sent to the terminal device and/or channel state information between the second network device and the terminal device, to improve reliability of multimedia broadcast multicast service transmission. In addition, the method helps send the feedback information corresponding to the second network device to the second network device through forwarding, to improve flexibility of service transmission between the second network device and the first network device, in other words, improve flexibility of control by the network device.

This application further provides an uplink feedback method 300. A difference between the uplink feedback method 300 and the uplink feedback method 100 lies in that in the uplink feedback method 300, first indication information indicates to disable a feedback function corresponding to a second network device. In some embodiments, the second network device may be a network device with large coverage, for example, a large tower. The uplink feedback method 300 helps resolve a problem of limited uplink feedback performed by a terminal device to the second network device, and further helps improve reliability of transmitting a service by the second network device. In addition, the uplink feedback method 300 also helps a network device side flexibly control, based on a multimedia broadcast multicast requirement, a service transmitted by a network device.

This application further provides an uplink feedback method 400. In the uplink feedback method 400, a terminal device may receive third indication information, and the third indication information may be the first indication information in the uplink feedback method 100 or the second indication information in the uplink feedback method 200. This helps the terminal device determine, based on the third indication information, a processing manner of feedback information corresponding to a second network device. Correspondingly, the network device side may flexibly indicate, based on a reliability requirement of a multimedia broadcast multicast service, the processing manner of the feedback information corresponding to the second network device, to improve flexibility of control by a network device. In some embodiments, in the uplink feedback method 400, the third indication information may include the first indication information and the second indication information, so that different processing manners are used for different feedback functions or feedback information, to further improve the flexibility of control by the network device.

The following describes the uplink feedback method 100 to the uplink feedback method 400 with reference to the accompanying drawings and the foregoing related concepts.

Embodiment 1: Uplink Feedback Method 100

Figure 9:
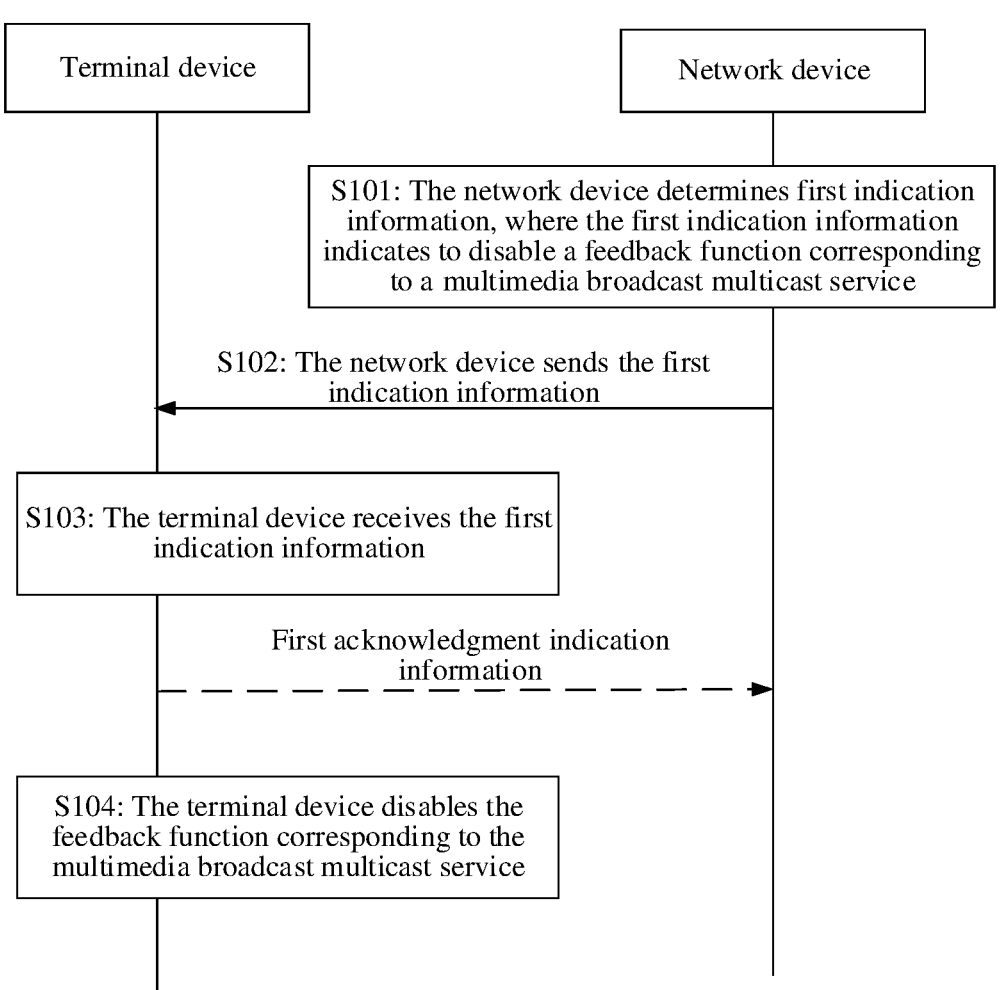
FIG. 9 is a schematic flowchart of an uplink feedback method 100 according to an embodiment of this application.

FIG. 9 is a schematic flowchart of an uplink feedback method 100 according to an embodiment of this application. The uplink feedback method 100 may be applied to any one of the communication system 100 to the communication system 300. As shown in FIG. 9, the uplink feedback method 100 includes but is not limited to the following steps.

S101: A network device determines first indication information, where the first indication information indicates to disable a feedback function corresponding to a multimedia broadcast multicast service.

In some embodiments, the first indication information may also be described as follows: The first indication information is used to close the feedback function corresponding to the multimedia broadcast multicast service, or the first indication information indicates to stop reporting feedback information corresponding to the multimedia broadcast multicast service.

In this embodiment of this application, the feedback function corresponding to the multimedia broadcast multicast service includes but is not limited to one or more of the following: a HARQ feedback function, a CSI feedback function, a channel quality indicator (channel quality indicator, CQI) feedback function, a precoding matrix indication (precoding matrix indication, PMI) feedback function, or a rank indication (rank indication, RI) feedback function in an antenna matrix.

As described in the foregoing term parts, the HARQ feedback function is a function in which a terminal device reports, on a HARQ feedback occasion after receiving a PDSCH, a HARQ corresponding to the PDSCH, where the PDSCH is a group PDSCH and is for sending the multimedia broadcast multicast service. The CSI feedback function is a function of reporting CSI after the terminal device obtains, through measurement, the CSI corresponding to the terminal device and a network device that sends the multimedia broadcast multicast service. An RI of the antenna matrix is a rank of the antenna matrix in a multiple-input multiple-output (multiple-input multiple-output, MIMO) system, and may indicate a quantity of parallel valid data flows.

S102: The network device sends the first indication information.

S103: The terminal device receives the first indication information.

S104: The terminal device disables the feedback function corresponding to the multimedia broadcast multicast service.

In some embodiments, the network device in steps S101 and S102 is the network device that sends the multimedia broadcast multicast service. For example, the uplink feedback method 100 is applied to the communication system 100 shown in FIG. 6. The network device 101 may send the multimedia broadcast multicast service. The network device 101 further performs steps S101 and S102, and the terminal device 102 performs steps S103 and S104. It can be learned that this implementation helps the network device notify the terminal device to disable the feedback function corresponding to the multimedia broadcast multicast service.

In at least this embodiment, the first indication information is included in configuration information of the network device; the first indication information is included in scheduling information of the multimedia broadcast multicast service; the first indication information is included in a system information block SIB from the network device; or the first indication information is included in radio access control RRC signaling from the network device.

For example, for the communication system 100 shown in FIG. 6, the first indication information may be included in configuration information of the network device 101, and the configuration information of the network device 101 indicates a related configuration of the network device. Alternatively, the first indication information is included in the scheduling information of the multimedia broadcast multicast service, for example, DCI including the scheduling information of the multimedia broadcast multicast service, where the DCI may be scrambled by using a G-RNTI. Alternatively, the first indication information is included in a broadcast message from the network device 101. For example, the network device 101 sends an SIB, and the SIB includes the first indication information. Alternatively, the first indication information is included in RRC signaling from the network device 101. To be specific, the network device 101 sends the RRC signaling, and the RRC signaling includes the first indication information.

In some embodiments, as shown in FIG. 9, the uplink feedback method 100 may further include: The terminal device sends first acknowledgment indication information. The network device receives the first acknowledgment indication information. The first acknowledgment indication information indicates to acknowledge that the feedback function corresponding to the multimedia broadcast multicast service is disabled or is to be disabled. It can be learned that, in at least this embodiment, the network device can learn that the terminal device acknowledges that the feedback function corresponding to the multimedia broadcast multicast service is disabled or is to be disabled, so that the network device can select a corresponding transmission method based on a reliability requirement of the multimedia broadcast multicast service, to improve flexibility of control by the network device. In addition, a radio resource that is of the terminal device and that corresponds to the disabled feedback function can be released in a timely manner, to avoid resource waste. In addition, this part of radio resources may be allocated to another terminal device, to improve resource utilization.

For example, the uplink feedback method 100 is applied to the communication system 100 shown in FIG. 6. In this case, the terminal device 102 may send the first acknowledgment indication information, and the network device 101 may receive the first acknowledgment indication information.

In some embodiments, that the terminal device sends first acknowledgment indication information may include: The terminal device triggers the first acknowledgment indication information. The terminal device sends the first acknowledgment indication information to the network device when there is an available uplink resource. A condition for triggering the first acknowledgment indication information by the terminal device may include: The terminal device receives the first indication information. To be specific, the terminal device may trigger the first acknowledgment indication information when receiving the first indication information, and may further send the first acknowledgment indication information to the network device when there is the available uplink resource.

In some embodiments, the multimedia broadcast multicast service is received by the terminal device from a second network device when the terminal device communicates with a first network device. The implementation may also be described as follows: When performing a unicast operation, the terminal device can further receive the multimedia broadcast multicast service; or when performing unicast communication with the first network device, the terminal device can further receive the multimedia broadcast multicast service from the second network device. It may be understood that the unicast operation or unicast communication means that the terminal device communicates (performs reception or sending) with the first network device in a unicast manner. Correspondingly, the network device in steps S101 and S102 may be the first network device or the second network device. In other words, the first indication information may be from the first network device or the second network device. It can be learned that this implementation facilitates flexible sending of the first indication information, and helps improve the flexibility of control by the network device.

In some embodiments, the first indication information may be sent by the first network device to the terminal device in a unicast manner, or may be sent by the second network device to the terminal device in a broadcast manner.

For example, the uplink feedback method 100 is applied to the communication system 200 shown in FIG. 7. The network device 202 may send the multimedia broadcast multicast service, the network device 201 or the network device 202 may perform steps S101 and S102, and the terminal device 203 performs steps S103 and S104. In some embodiments, when communicating with the network device 201, the terminal device 203 may further receive the multimedia broadcast multicast service from the network device 202. The terminal device 203 may perform a unicast operation with the network device 201, for example, receiving a unicast service or sending a unicast service. In some embodiments, when the network device 202 sends the multimedia broadcast multicast service, and the network device 201 performs steps S101 and S102, the network device 201 and the network device 202 may exchange information related to the multimedia broadcast multicast service through an interface between the network devices, to determine the first indication information. The interface between the network devices may be an Xn interface.

Figures 10, 11A, 11B:
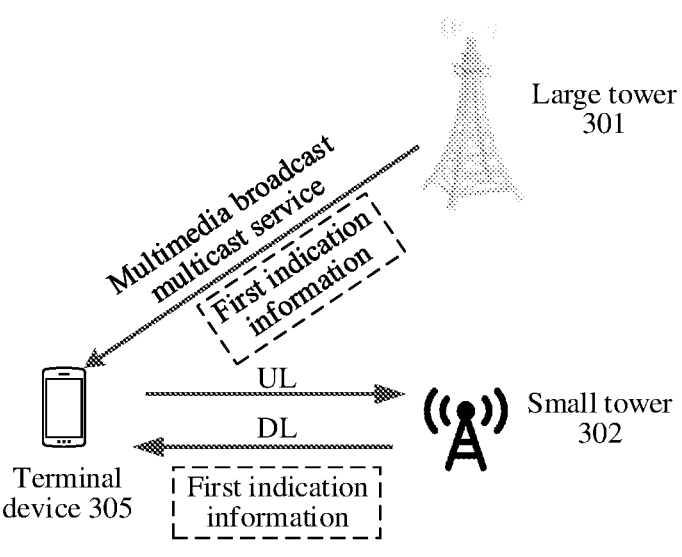

For another example, the uplink feedback method 100 is applied to the communication system 300 shown in FIG. 8. As shown in FIG. 10, a large tower 301 may send a multimedia broadcast multicast service, a small tower 302 may perform a unicast operation with a terminal device 305, for example, uplink (uplink, UL) or downlink (downlink, DL) transmission, the large tower 301 or the small tower 302 may perform steps S101 and S102, the terminal device 305 may perform steps S103 and S104, and the terminal device 305 is a terminal device in coverage of the small tower 302. As shown in FIG. 10, when communicating with the corresponding small tower 302, the terminal device 305 may further receive the multimedia broadcast multicast service from the large tower 301. When performing the unicast operation between the terminal device 305 and the corresponding small tower 302, for example, receiving a unicast service or sending a unicast service, the terminal device 305 may further receive the multimedia broadcast multicast service from the large tower 301.

Correspondingly, the first indication information may be further described as follows: The first indication information indicates to disable or close, during unicast service transmission with the first network device and multimedia broadcast multicast service transmission with the second network device, the feedback function corresponding to the multimedia broadcast multicast service.

In at least this embodiment, the first indication information is included in configuration information of the second network device; the first indication information is included in scheduling information of the multimedia broadcast multicast service; the first indication information is included in a system information block SIB from the first network device; or the first indication information is included in radio access control RRC signaling from the first network device. In other words, the configuration information of the second network device indicates a related configuration of the second network device, and the configuration information of the second network device includes the first indication information; or the system information block sent by the first network device includes the first indication information; or the RRC signaling sent by the first network device includes the first indication information.

1.1. The following describes an indication manner of the first indication information in steps S101 to S103 in this embodiment of this application. A specific indication manner of the first indication information may include but is not limited to any one or more of the following implementations.

Implementation 1.1.1: The first indication information includes a feedback indication, and the feedback indication indicates to disable the feedback function corresponding to the multimedia broadcast multicast service.

In at least this embodiment, one feedback indication indicates whether to disable the two feedback functions, and this helps reduce signaling overheads.

For example, the first indication information is one field. If the terminal device determines that the configuration information of the network device, the scheduling information of the multimedia broadcast multicast service, the system information block, or the RRC signaling sent by the network device includes the field, the terminal device disables the feedback function corresponding to the multimedia broadcast multicast service. If the terminal device determines that the configuration information of the network device, the scheduling information of the multimedia broadcast multicast service, the system information block, or the RRC signaling sent by the network device does not include the field, the terminal device enables the feedback function corresponding to the multimedia broadcast multicast service. In some embodiments, the field may be referred to as a feedback indication field, a disabling indication field, or the like. This is not limited in this embodiment of this application.

For another example, the first indication information is one bit. When the terminal device determines that the bit is 1, the terminal device disables the feedback function corresponding to the multimedia broadcast multicast service; when the terminal device determines that the bit is 0, the terminal device enables the feedback function corresponding to the multimedia broadcast multicast service. In some embodiments, the bit may be referred to as a feedback indication or a disabling indication, and may be located in the foregoing configuration information of the network device, scheduling information of the multimedia broadcast multicast service, system information block, or RRC signaling sent by the network device.

Implementation 1.1.2: The first indication information includes a plurality of feedback indications, one feedback indication corresponds to one feedback function, and the feedback indication indicates to disable the corresponding feedback function.

The feedback function includes a HARQ feedback function, a CSI feedback function, a CQI feedback function, a PMI feedback function, or an RI feedback function that corresponds to the multimedia broadcast multicast service. One feedback indication may be one field or one bit, to indicate whether to disable the corresponding feedback function. In at least this embodiment, the network device disables one or more of the feedback functions, to improve flexibility of control by the network device.

For example, the first indication information includes three feedback indications: a feedback indication A, a feedback indication B, and a feedback indication C. The feedback indication A indicates to disable the HARQ feedback function corresponding to the multimedia broadcast multicast service, the feedback indication B indicates to disable the CSI feedback function corresponding to the multimedia broadcast multicast service, and the feedback indication C indicates to disable the CQI feedback function corresponding to the multimedia broadcast multicast service.

In an optional manner, one feedback indication is one field, each feedback function corresponding to the multimedia broadcast multicast service corresponds to one field, and a quantity of fields corresponding to the first indication information is equal to a quantity of feedback functions corresponding to the multimedia broadcast multicast service. When there is the corresponding field in the configuration information of the network device, the scheduling information of the multimedia broadcast multicast service, the system information block, or the RRC signaling sent by the network device, it indicates that the terminal device is to disable the corresponding feedback function.

For example, the first indication information includes two feedback indications: a field 1 and a field 2. The field 1 indicates to disable the HARQ feedback function corresponding to the multimedia broadcast multicast service, and the field 2 indicates to disable the CSI feedback function corresponding to the multimedia broadcast multicast service. If the field 1 corresponding to the HARQ feedback function exists in the configuration information of the network device, the scheduling information of the multimedia broadcast multicast service, the system information block, or the RRC signaling sent by the network device, the terminal device disables the HARQ feedback function corresponding to the multimedia broadcast multicast service. If the field 2 corresponding to the CSI feedback function exists in the configuration information of the network device, the scheduling information of the multimedia broadcast multicast service, the system information block, or the RRC signaling sent by the network device, the terminal device disables the CSI feedback function corresponding to the multimedia broadcast multicast service. If both fields exist, the terminal device disables the HARQ feedback function and the CSI feedback function that correspond to the multimedia broadcast multicast service.

For another example, it is assumed that the feedback function corresponding to the multimedia broadcast multicast service includes the HARQ feedback function, the CSI feedback function, the CQI feedback function, the PMI feedback function, and the RI feedback function, and each feedback function corresponds to one field. If the configuration information of the network device, the scheduling information of the multimedia broadcast multicast service, the system information block, or the RRC signaling sent by the network device includes the fields respectively corresponding to the HARQ feedback function, the CSI feedback function, the CQI feedback function, the PMI feedback function, and the RI feedback function of the multimedia broadcast multicast service, the terminal device disables the HARQ feedback function, the CSI feedback function, the CQI feedback function, the PMI feedback function, and the RI feedback function that correspond to the multimedia broadcast multicast service.

In another optional manner, one feedback indication is one bit, and each feedback function corresponding to the multimedia broadcast multicast service corresponds to one bit. When a bit that corresponds to a feedback function and that is in the first indication information is 1, it indicates that the terminal device is to disable the corresponding feedback function; when a bit that corresponds to a feedback function and that is in the first indication information is 0, it indicates that the terminal device is to enable the corresponding feedback function. That is, in at least this embodiment, a bitmap indicates, one by one, whether each feedback function is disabled or is to be disabled. A quantity of bits occupied by the first indication information is equal to a quantity of feedback functions corresponding to the multimedia broadcast multicast service, and a correspondence between each bit in the first indication information and each feedback function may be predefined.

For example, it is assumed that the feedback function corresponding to the multimedia broadcast multicast service includes the HARQ feedback function and the CSI feedback function. In this case, the first indication information has two bits, where the first bit corresponds to the HARQ feedback function, and the second bit corresponds to the CSI feedback function. If the first indication information is 11, it indicates that the terminal device is to disable the HARQ feedback function and the CSI feedback function. If the first indication information is 10, it indicates that the terminal device is to disable the HARQ feedback function and enable the CSI feedback function. If the first indication information is 01, it indicates that the terminal device is to enable the HARQ feedback function and disable the CSI feedback function.

For another example, it is assumed that the feedback function corresponding to the multimedia broadcast multicast service includes the HARQ feedback function, the CSI feedback function, the CQI feedback function, the PMI feedback function, and the RI feedback function. In this case, the first indication information occupies five bits, and the five bits sequentially correspond to the five feedback functions. If the first indication information is 11111, it indicates that the terminal device is to disable the HARQ feedback function, the CSI feedback function, the CQI feedback function, the PMI feedback function, and the RI feedback function. Details are not described in this embodiment of this application.

Implementation 1.1.3: The first indication information occupies N bits, the N bits can indicate $2^N$ feedback indications, and each feedback indication corresponds to one or more feedback functions. N is determined based on a quantity of feedback indications that need to be indicated by the first indication information.

For example, as shown in Table 1, it is assumed that the N bits need to indicate three states: disabling the HARQ feedback function corresponding to the multimedia broadcast multicast service, disabling the CSI feedback function corresponding to the multimedia broadcast multicast service, and disabling the HARQ feedback function and the CSI feedback function corresponding to the multimedia broadcast multicast service. Therefore, the first indication information needs at least $\lceil \log_2 3 \rceil$ bits, that is, two bits.

In some embodiments, as shown in Table 1, 00 indicates to disable the HARQ feedback function corresponding to the multimedia broadcast multicast service; 01 indicates to disable the CSI feedback function corresponding to the multimedia broadcast multicast service; 10 indicates to disable the HARQ feedback function and the CSI feedback function that correspond to the multimedia broadcast multicast service; and 11 is a reserved bit.

TABLE 1

| First indication information | Meaning |
|---|---|
| 00 | Disable the HARQ feedback function corresponding to the multimedia broadcast multicast service |
| 01 | Disable the CSI feedback function corresponding to the multimedia broadcast multicast service |
| 10 | Disable the HARQ feedback function and the CSI feedback function that correspond to the multimedia broadcast multicast service |
| 11 | Reserved bit |

In some embodiments, the feedback function corresponding to the multimedia broadcast multicast service includes one or more of the following: the HARQ feedback function, the CSI feedback function, the CQI feedback function, the PMI feedback function, or the RI feedback function. Therefore, a quantity of states that need to be indicated by the first indication information is $$C_5^1 + C_5^2 + C_5^3 + C_5^4 + 1 = 31$$

Therefore, the first indication information needs at least $\lceil \log_2 31 \rceil$ bits, that is, five bits. The first indication information may indicate the one or more feedback functions by using different values of the five bits, and details are not described herein again.

1.2. The following describes an indication granularity of the first indication information in steps S101 to S103 in this embodiment of this application. The indication granularity of the first indication information may include but is not limited to any one or more of the following implementations.

Implementation 1.2.1: The indication granularity of the first indication information is a terminal device for indication.

The first indication information indicates to disable the one or more feedback functions corresponding to the multimedia broadcast multicast service. It can be learned that this implementation is at a granularity of a terminal device. To be specific, the terminal device disables all the one or more feedback functions corresponding to the multimedia broadcast multicast service, without considering a specific type of service in the multimedia broadcast multicast service.

In some embodiments, in at least this embodiment, the first indication information may further include an identifier of a terminal device. In this way, the first indication information indicates a terminal device corresponding to an identifier of each terminal device to disable the one or more feedback functions corresponding to the multimedia broadcast multicast service. In other words, the first indication information may indicate some terminal devices to disable the one or more feedback functions corresponding to the multimedia broadcast multicast service, so that indication is performed based on a capability of a terminal device, to improve flexibility of control by the network device.

Implementation 1.2.2: The indication granularity of the first indication information is a service for indication.

The first indication information includes one or more service identifiers, and each service identifier corresponds to one service that is in the multimedia broadcast multicast service. The first indication information indicates to disable a feedback function of the service that corresponds to each service identifier and that is in the multimedia broadcast multicast service. It can be learned that this implementation is at a granularity of a service. To be specific, the terminal device may disable a feedback function of one or more services in the multimedia broadcast multicast service based on the first indication information.

As described in the foregoing descriptions of the multimedia broadcast multicast service, the multimedia broadcast multicast service may include a plurality of services, and a continuously transmitted service or a discontinuously transmitted service may be configured in the plurality of services. One G-RNTI or TMGI is associated with one service of one multimedia broadcast multicast service. Therefore, the service identifier may be a G-RNTI or a TMGI. In this way, the terminal device may determine, based on the service identifier included in the first indication information, to disable the feedback function of the corresponding service.

For example, it is assumed that a G-RNTI 1 is associated with a multimedia broadcast multicast service 1, and a G-RNTI 2 is associated with a multimedia broadcast multicast service 2. If the first indication information includes the G-RNTI 1 and the G-RNTI 2, the terminal device may disable a feedback function of the multimedia broadcast multicast service 1 corresponding to the G-RNTI 1 and a feedback function of the multimedia broadcast multicast service 2 corresponding to the G-RNTI 2. The feedback function herein may be the HARQ feedback function.

In some embodiments, the following may be predefined or notified by using signaling: A feedback function of a service corresponding to a service identifier that is not included in the first indication information is to be enabled, in other words, the feedback function of the service corresponding to the service identifier that is not included in the first indication information is to be enabled; and a feedback function of a service corresponding to a service identifier that is included in the first indication information is disabled or is to be disabled. In at least this embodiment, the network device enables or disables a feedback function of a corresponding service based on a reliability requirement of each multimedia broadcast multicast service.

For example, the network device transmits a multimedia broadcast multicast service 1 to a multimedia broadcast multicast service 3 through a multicast transmission channel. The multimedia broadcast multicast service 1 is associated with a G-RNTI 1, the multimedia broadcast multicast service 2 is associated with a G-RNTI 2, the multimedia broadcast multicast service 3 is associated with a G-RNTI 3, and the first indication information includes the G-RNTI 1 and the G-RNTI 3. In this case, the terminal device may determine to disable feedback functions of the multimedia broadcast multicast service 1 and the multimedia broadcast multicast service 3, and enable a feedback function of the multimedia broadcast multicast service 2.

Implementation 1.2.3: The indication granularity of the first indication information is a terminal device and a service for indication.

In other words, Implementation 1.2.3 may be a combination of Implementation 1.2.1 and Implementation 1.2.2. The first indication information may include a service identifier and an identifier of a terminal device, so that the network device disables feedback functions of some multimedia broadcast multicast services of some terminal devices based on a control requirement, to improve flexibility of control by the network device.

In some embodiments, Implementation 1.1 and Implementation 1.2 may be combined. For example, the first indication information may include the service identifier, the identifier of the terminal device, and the plurality of feedback indications, and the first indication information may indicate some terminal devices to disable feedback functions indicated by feedback indication of a service corresponding to the service identifier.

1.3. The following may include but is not limited to the following related implementations of the first acknowledgment indication information further sent by the terminal device in this embodiment of this application.

In some embodiments, the first acknowledgment indication information may also include one or more service identifiers, and each service identifier corresponds to one service that is in the multimedia broadcast multicast service; and the first acknowledgment indication information indicates to acknowledge that a feedback function of the service that corresponds to each service identifier and that is in the multimedia broadcast multicast service is disabled or is to be disabled. In some embodiments, the service identifiers respectively included in the first acknowledgment indication information and the first indication information may be the same or different, so that the terminal device and the network device can negotiate for determining the multimedia broadcast multicast service whose feedback function is disabled or is to be disabled.

In some embodiments, the first acknowledgment indication information is carried in a first media access control control element (media access control control element, MAC CE), and the first MAC CE includes a preset logical channel identifier (logical channel ID, LCID) value.

In some embodiments, the first MAC CE is identified by using a MAC subheader carrying a first LCID, and the first LCID is a preset value, to identify that the MAC CE is a first MAC CE used to carry the first acknowledgment indication information.

The first LCID may be identified by using 5 bits, and the first LCID may be 10001 or one of 01011 to 01111, where 01011 to 01111 are a range of the LCID value reserved in a protocol; or the first LCID may be identified by using 6 bits, and the first LCID may be an LCID value such as 100011 reserved in a protocol. In some embodiments, a length of the first MAC CE may be 0.

For example, FIG. 11a to FIG. 11c are schematic diagrams of a MAC subheader according to an embodiment of this application. As shown in FIG. 11a to FIG. 11c, the first MAC CE may be identified by using a MAC subheader carrying the first LCID. R is a reserved bit in the MAC subheader, and F indicates a quantity of bits corresponding to a length field carried in the MAC CE. E is an extension indication, and is used to identify whether there is another MAC subheader after the MAC subheader.

In some embodiments, the first MAC CE is identified by using a MAC subheader that carries a second LCID and a third LCID. A value of the second LCID may be 33 (namely, 100001) or 34 (namely, 100010). A field in which the third LCID is located may be one byte or two bytes, and a value of the third LCID may be any one of 64 to 319, or a value of the third LCID may be any one of $(2^{16}+192)$ to $(2^{16}+319)$. The third LCID is used to identify that the MAC CE is the first MAC CE used to carry the first acknowledgment indication information. The third LCID may also be referred to as an extended LCID (extended LCID, eLCID), to identify that the MAC CE in which the third LCID is located is the first MAC CE. A length of the first MAC CE may be 0.

For example, FIG. 12a and FIG. 12b are schematic diagrams of a MAC subheader according to an embodiment of this application. As shown in FIG. 12a and FIG. 12b, the MAC subheader may include both a second LCID and a third LCID, to identify that a MAC CE in which the MAC subheader is located is the first MAC CE. R is a reserved bit in the MAC subheader, and F indicates a quantity of bits corresponding to a length field carried in the MAC CE.

In some embodiments, a subheader of the first MAC CE may be any MAC subheader in the foregoing two implementations, but a length of the first MAC CE is not zero. The first MAC CE may include one or more service identifiers, for example, the TMGI or the G-RNTI described above. Therefore, the terminal device and the network device can negotiate for determining the multimedia broadcast multicast service whose feedback function is disabled or is to be disabled.

For example, FIG. 13 is a schematic diagram of a frame structure of a first MAC CE according to an embodiment of this application. As shown in FIG. 13, a MAC subheader of the first MAC CE may be any MAC subheader shown in FIG. 11a to FIG. 11c, or the MAC subheader shown in FIG. 12a or FIG. 12b. A length of the first MAC CE is not zero. As shown in FIG. 13, the first MAC CE may carry a quantity of multimedia broadcast multicast service identifiers, for example, n, and a specific multimedia broadcast multicast service identifier 1 to a specific multimedia broadcast multicast service identifier n. The multimedia broadcast multicast service identifier may be a TMGI or a G-RNTI.

"Disable" in this specification may also be replaced with "close". For example, the first indication information indicates to disable the feedback function corresponding to the multimedia broadcast multicast service, and may be described as follows: The first indication information indicates to close the feedback function corresponding to the multimedia broadcast multicast service.

It can be learned that, in the uplink feedback method 100 according to Embodiment 1, the terminal device may disable, based on the first indication information, the feedback function corresponding to the multimedia broadcast multicast service. In other words, in this method, the feedback function corresponding to the multimedia broadcast multicast service may be clearly closed. Therefore, in a future communication system, a network device transmits a multimedia broadcast multicast service that has a high reliability requirement in a more reliable transmission manner, to improve reliability of the multimedia broadcast multicast service. For example, for a multimedia broadcast multicast service having a relatively high reliability requirement, the network device may transmit, in a unicast manner, data corresponding to the multimedia broadcast multicast service. In addition, according to the method, it can be clearly indicated to close the feedback function corresponding to the multimedia broadcast multicast service. This also helps the network device to transmit the multimedia broadcast multicast service in a corresponding transmission manner based on a reliability requirement of the multimedia broadcast multicast service. Therefore, the method helps improve flexibility of control by the network device.

Embodiment 2: Uplink Feedback Method 200

Figure 14:
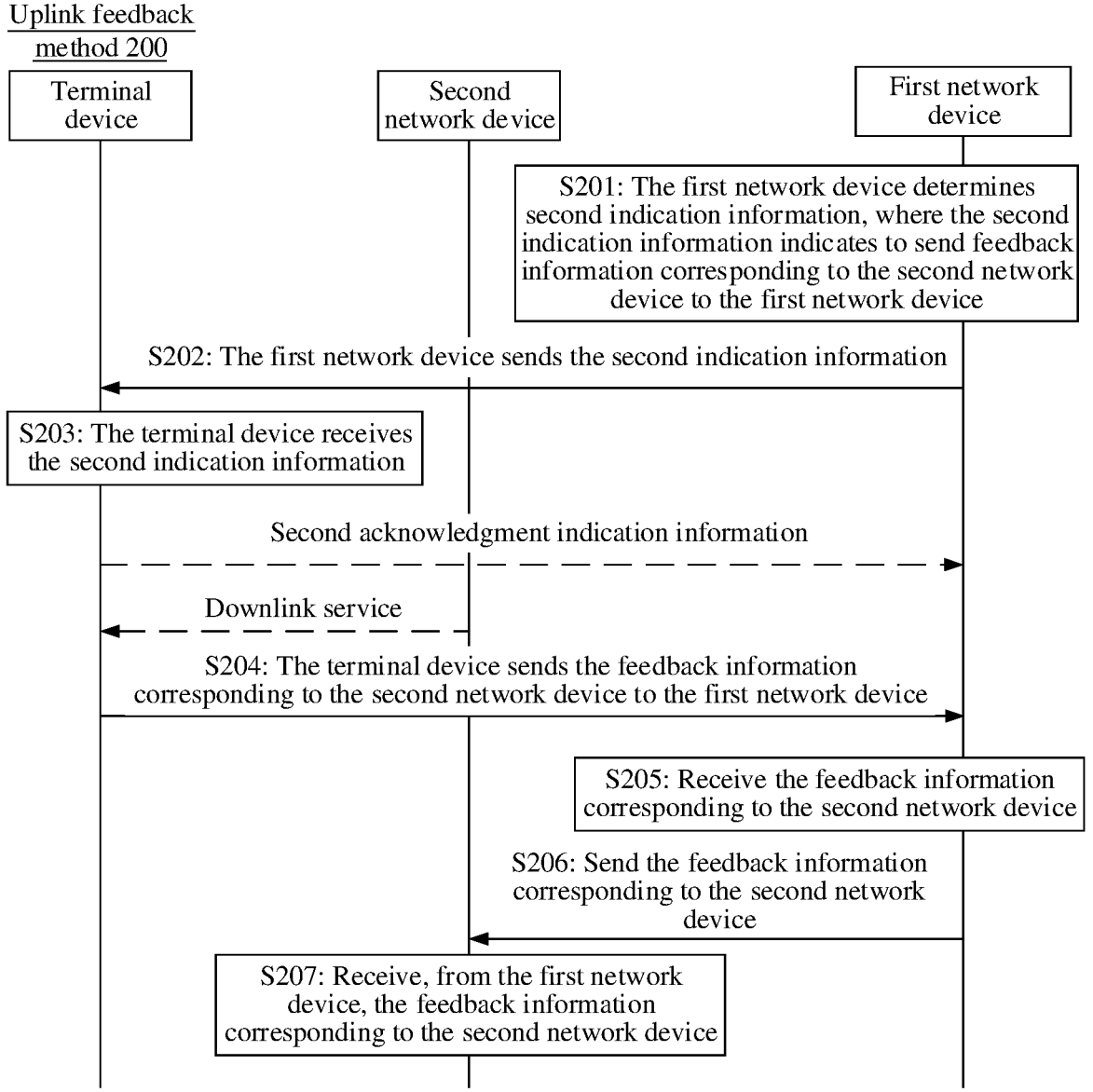
FIG. 14 is a schematic flowchart of an uplink feedback method 200 according to an embodiment of this application.

FIG. 14 is a schematic flowchart of an uplink feedback method 200 according to an embodiment of this application. The uplink feedback method 200 shown in FIG. 14 may be applied to but is not limited to the communication systems shown in FIG. 7 and FIG. 8. In the uplink feedback method 200, a terminal device may transmit feedback information corresponding to a second network device to a first network device, and the first network device forwards the feedback information to a second network device. As shown in FIG. 14, the uplink feedback method 200 includes but is not limited to the following steps.

S201: The first network device determines second indication information, where the second indication information indicates to send the feedback information corresponding to the second network device to the first network device.

In some embodiments, interaction information may be sent between the first network device and the second network device through an interface (for example, an Xn interface) between network devices. The interaction information may include at least one of the following: location information of the terminal device, received quality of the terminal device in coverage of the second network device, information about an interest of the terminal device in a multimedia broadcast multicast service, and information about a receiving capability of the terminal device for a multimedia broadcast multicast service. The received quality of the terminal device in the coverage of the second network device may be: reference signal received power (reference signal received power, RSRP) and/or reference signal received quality (reference signal received quality, RSRQ). In this way, the second network device determines, based on the interaction information, whether the first network device forwards the feedback information corresponding to the second network device, and determines which network device forwards the feedback information. Alternatively, the first network device determines, based on the interaction information, whether the first network device forwards the feedback information corresponding to the second network device.

S202: The first network device sends the second indication information.

The second indication information is from the first network device or the second network device. In other words, steps S201 and S202 may be performed by the second network device.

S203: The terminal device receives the second indication information.

S204: The terminal device sends the feedback information corresponding to the second network device to the first network device.

S205: The first network device receives the feedback information corresponding to the second network device.

S206: The first network device sends the feedback information corresponding to the second network device to the second network device.

S207: The second network device receives, from the first network device, the feedback information corresponding to the second network device.

The second indication information may also be described as follows: The second indication information indicates to send, through forwarding, the feedback information corresponding to the second network device; or the second indication information indicates to first transmit the feedback information corresponding to the second network device to the first network device, and then forward (or send) the feedback information by the first network device to the second network device. "Forwarding" means that the feedback information that is fed back by the terminal device and that corresponds to the second network device is sent by the first network device to the second network device.

It can be learned that, in the uplink feedback method 200, the first network device may forward the feedback information corresponding to the second network device. This helps resolve a problem of limited uplink feedback performed by the terminal device to the second network device, and helps the second network device learn of HARQ information of a downlink service sent to the terminal device and/or channel state information between the second network device and the terminal device, to improve downlink transmission reliability. In addition, the second network device can also obtain a HARQ feedback. Therefore, this helps improve flexibility of control by the network device.

Figure 15:
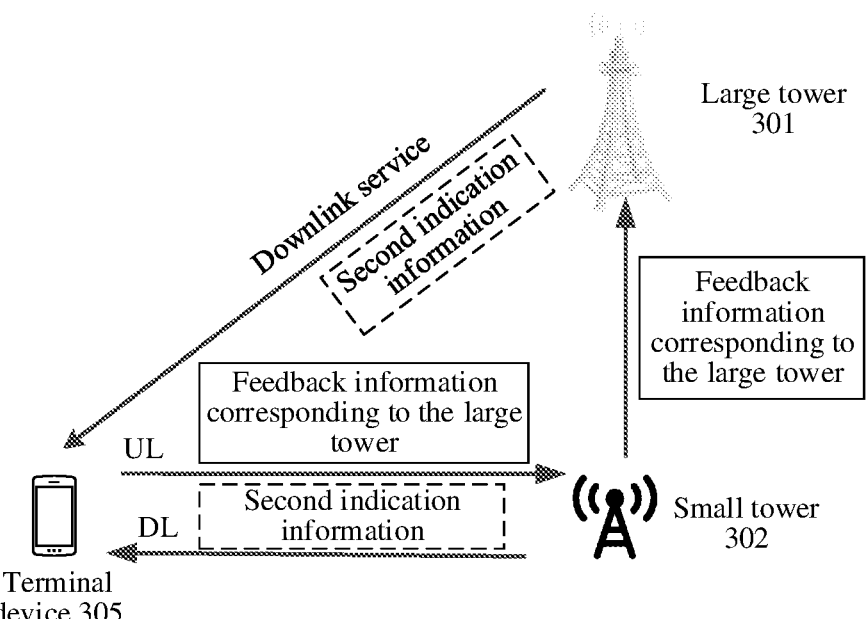
FIG. 15 is a schematic diagram of an uplink feedback method according to an embodiment of this application.

The uplink feedback method 200 is applied to the communication system shown in FIG. 8. As shown in FIG. 15, the first network device is a small tower 302, and the second network device is a large tower 301. The second indication information may be further described as follows: The second indication information indicates to send, through forwarding, feedback information corresponding to the large tower; or the second indication information indicates to first transmit feedback information corresponding to the large tower to the small tower, and then transmit the feedback information to the large tower by the small tower through an Xn interface. Correspondingly, as shown in FIG. 15, the large tower sends a downlink service to a terminal device, and the terminal device 305 may send the feedback information corresponding to the large tower to the small tower 302. Further, the small tower 302 may send the feedback information corresponding to the large tower to the large tower 301. The second indication information may be from the small tower 302 or the large tower 301. The large tower 301 may send the second indication information in a multimedia broadcast multicast manner.

It can be learned that this implementation helps resolve a problem of limited uplink feedback performed by the terminal device to the large tower in the communication system shown in FIG. 8, so that the large tower can learn of the HARQ feedback of the multimedia broadcast multicast service sent to the terminal device and/or the channel state information between the large tower and the terminal device, to improve reliability of multimedia broadcast multicast service transmission. In addition, the method helps send the feedback information corresponding to the large tower to the large tower through forwarding, to improve flexibility of service transmission between the large tower and the small tower, in other words, improve flexibility of control by the network device. In other words, when a nationally issued radio 700M band is used for 5G deployment, and a networking manner is a large tower+small tower interworking deployment method (as shown in FIG. 8), the uplink feedback method 200 resolves a problem of multicast uplink feedback and how to perform feedback if multicast uplink feedback is performed.

2.1. Before step S204, the second network device may send a downlink service. The downlink service may include but is not limited to the multimedia broadcast multicast service, a unicast service, and the like.

In Implementation 2.1.1, before the terminal device performs step S204, the second network device may send the multimedia broadcast multicast service. Correspondingly, the terminal device receives the multimedia broadcast multicast service from the second network device. In this way, when the terminal device performs step S204, the feedback information corresponding to the second network device includes HARQ information corresponding to the multimedia broadcast multicast service.

In Implementation 2.1.2, before the terminal device performs step S204, the second network device may send the unicast service. Correspondingly, the terminal device receives the unicast service from the second network device. In this way, when the terminal device performs step S204, the feedback information corresponding to the second network device includes feedback information corresponding to the unicast service.

In some embodiments, the service that can be sent by the second network device includes but is not limited to the multimedia broadcast multicast service, the unicast service, and the like in the foregoing two implementations, and may alternatively be another service. The feedback information corresponding to the second network device may include but is not limited to one or more of the following: HARQ information, CSI, a CQI, a PMI, or an RI of the multimedia broadcast multicast service or the unicast service.

In some embodiments, the first network device may receive the feedback information corresponding to the second network device in step S205 may include: The first network device receives feedback information from the terminal device. The first network device determines, according to Implementation 2.2, that the feedback information is the feedback information corresponding to the second network device. To be specific, the feedback information received by the first network device may be feedback information corresponding to the first network device, or may be feedback information corresponding to one or more second network devices. Therefore, the first network device needs to perform further determining according to Implementation 2.2.

2.2. An optional implementation of how the first network device determines that the feedback information is the feedback information corresponding to the second network device includes but is not limited to the following implementations.

In Implementation 2.2.1, the first network device determines, in an explicit manner, that the HARQ information is the feedback information corresponding to the second network device.

The explicit manner may be as follows: The feedback information sent by the terminal device to the first network device explicitly includes HARQ timing information and/or an identifier of the second network device, so that the first network device determines that the HARQ information is the feedback information corresponding to the second network device.

In other words, when the feedback information includes the HARQ information, the HARQ information from the terminal device further includes the corresponding HARQ timing information and/or the identifier of the second network device. The HARQ timing information includes one or more of the following: a feedback timing indicator K1, absolute receive time n of downlink data, or a HARQ process identifier. When the HARQ information includes the corresponding HARQ timing information, the first network device determines, based on the HARQ timing information, a network device corresponding to the HARQ information, for example, determines the identifier of the second network device.

This implementation helps the first network device determine, based on the HARQ timing information corresponding to the HARQ information and/or the identifier of the second network device, whether the HARQ information is HARQ information that needs to be sent to the second network device.

For example, the first network device interacts with the second network device, to learn of absolute send time at which the second network device sends the downlink data, and then may determine the absolute receive time n of the downlink data. If absolute receive time n corresponding to the HARQ information is the same as the absolute receive time n of the downlink data, the first network device may determine that the HARQ information is HARQ information of the downlink data sent by the second network device, and may send the HARQ information to the second network device.

In Implementation 2.2.2, the first network device determines, in an implicit manner, that the HARQ information is the feedback information corresponding to the second network device.

In some embodiments of the implicit manner, the first network device determines, based on one or more of a scrambling identifier of the HARQ information, a physical transmission resource, or a HARQ feedback codebook, whether the HARQ information is HARQ information that needs to be sent to the second network device. In other words, whether the HARQ information is the feedback information corresponding to the second network device is indicated by using one or more of the scrambling identifier of the HARQ information, the physical transmission resource, or the HARQ feedback codebook.

In some embodiments of the implicit manner, the first network device obtains, through calculation based on a preset HARQ feedback timing indicator K1, HARQ timing information corresponding to the HARQ information, so that the first network device determines, based on the HARQ timing information obtained through calculation, whether the HARQ information is HARQ information that needs to be sent to the second network device.

Implementation 2.2.3: The first network device may determine, in an explicit manner or an implicit manner, that any one or more of the CSI, the CQI, the PMI, or the RI are the feedback information corresponding to the second network device.

In the explicit manner, any one or more of the CSI, the CQI, the PMI, or the RI sent by the terminal device may also explicitly include an identifier of the second network device, so that the first network device determines that any one or more of the CSI, the CQI, the PMI, or the RI need to be sent to the second network device.

In an implicit manner, any one or more of the CSI, the CQI, the PMI, or the RI sent by the terminal device may not need to explicitly include an identifier of the second network device, but determine, based on a scrambling identifier and/or a physical transmission resource of any one or more of the CSI, the CQI, the PMI, or the RI, whether the any one or more of the CSI, the CQI, the PMI, or the RI need to be sent to the second network device.

In addition, in step S206, when the first network device sends the HARQ information to the second network device, the HARQ information further needs to carry HARQ timing information. The HARQ timing information may be obtained by the first network device through calculation (for example, obtained through calculation based on the feedback timing indicator K1), or may be explicitly carried in the HARQ information reported by the terminal device. In this way, the second network device can learn of a downlink service corresponding to the HARQ information, for example, learn that the downlink service is the multimedia broadcast multicast service sent by the second network device, so as to determine whether the multimedia broadcast multicast service is retransmitted and a retransmission policy during retransmission.

In one manner, the first network device determines that the feedback information is the feedback information corresponding to the second network device, for example, information such as the HARQ information, the CSI, or the PMI, and forwards the feedback information to the corresponding second network device in a timely manner. In this manner, the first network device directly forwards a received feedback result to the second network device, so as to send the feedback information reported by the terminal device to the corresponding second network device more quickly, so that the second network device performs determining in a timely manner. In addition, processing operations of the first network device are also reduced.

In another manner, for the HARQ information, the first network device may send the HARQ information by using, but not limited to, one or more implementations described in Implementation 2.3.

2.3. An optional implementation in which the first network device sends the HARQ information corresponding to the second network device includes but is not limited to the following implementations.

Implementation 2.3.1: The first network device combines HARQ information corresponding to same HARQ timing information or a same second network device, to obtain a HARQ information set, and sends the HARQ information set to the corresponding second network device.

To be specific, in step S206, that the first network device sends the HARQ information corresponding to the second network device to the second network device includes: The first network device determines a HARQ information set, where HARQ timing information of all HARQ information in the HARQ information set is the same, or a corresponding second network device identifier is the same. The first network device sends the HARQ information set to the corresponding second network device.

After combining the HARQ information corresponding to the same HARQ timing information to obtain the HARQ information set, the first network device may further determine, based on the HARQ timing information, the second network device corresponding to the HARQ information set, so as to send the HARQ information set to the corresponding second network device.

In addition, the HARQ information set includes the HARQ timing information corresponding to all HARQ information, so that the second network device determines a corresponding retransmission policy based on the HARQ timing information and the HARQ information. It can be learned that this manner helps the second network device identify the HARQ information based on the HARQ timing information, and therefore helps the second network device formulate the corresponding retransmission policy for subsequent retransmission of the downlink data.

The HARQ timing information includes one or more of the following: the feedback timing indicator K1, the absolute receive time n of the downlink data, or the HARQ process identifier.

It can be learned that, in at least this embodiment, the first network device may combine the HARQ information corresponding to the same HARQ timing information or the same second network device and feed back combined HARQ information to the corresponding second network device. This helps the second network device efficiently determine the retransmission policy of the downlink data, and improves efficiency of retransmitting the downlink data by the second network device.

Implementation 2.3.2: The first network device collects statistics on a HARQ information set corresponding to each piece of HARQ timing information, obtains a statistical result, and sends the statistical result to the second network device.

To be specific, in step S205, the first network device collects statistics on the HARQ information set corresponding to each piece of HARQ timing information, to obtain a quantity of NACKs and/or a ratio of the NACKs corresponding to the HARQ timing information, and then the first network device sends, to the second network device, the quantity of NACKs and/or the ratio of the NACKs corresponding to the HARQ timing information.

It can be learned that, in at least this embodiment, the first network device sends a quantity of NACKs and/or a ratio of the NACKs corresponding to a same piece of HARQ timing information. This helps reduce signaling overheads.

Implementation 2.3.3: In addition to sending a statistical result corresponding to each piece of HARQ timing information to the second network device, the first network device further sends an identifier that is of a terminal device and that corresponds to each NACK in the statistical result.

It can be learned that in at least this embodiment, the first network device may further indicate and send the identifier that is of the terminal device and that corresponds to each NACK, to notify the second network device of terminal devices whose HARQ feedback fails, namely, terminal devices that fail to receive the downlink data from the second network device.

Implementation 2.3.4: After obtaining a statistical result corresponding to each piece of HARQ timing information, the first network device determines, based on the statistical result, whether to send an identifier that is of a terminal device and that corresponds to each NACK in the statistical result.

In one manner, the first network device determines whether a quantity of NACKs corresponding to the HARQ timing information is greater than or equal to a first threshold. If the quantity is greater than or equal to the first threshold, the first network device sends the quantity of NACKs corresponding to the HARQ timing information. If the quantity is less than the first threshold, the first network device sends the quantity of NACKs corresponding to the HARQ timing information and the identifier that is of the terminal device and that corresponds to each NACK.

In another manner, the first network device determines whether a ratio of NACKs corresponding to the HARQ timing information is greater than or equal to a second threshold. If the ratio of the NACKs is greater than or equal to the second threshold, the first network device sends the ratio of the NACKs corresponding to the HARQ timing information. If the ratio of the NACKs is less than the second threshold, the first network device sends the ratio of the NACKs corresponding to the HARQ timing information and the identifier that is of the terminal device and that corresponds to each NACK.

In still another manner, the foregoing two manners are combined to determine whether to further send the identifier that is of the terminal device and that corresponds to each NACK. For example, if the first network device determines that the quantity of NACKs corresponding to the HARQ timing information is greater than or equal to the first threshold and the ratio of the NACKs corresponding to the HARQ timing information is greater than or equal to the second threshold, the first network device sends the quantity of NACKs and the ratio of the NACKs corresponding to the HARQ timing information. If the first network device determines that the quantity of NACKs corresponding to the HARQ timing information is less than the first threshold or the ratio of the NACKs corresponding to the HARQ timing information is less than the second threshold, the first network device sends the quantity of NACKs or the ratio of the NACKs corresponding to the HARQ timing information, and the identifier that is of the terminal device and that corresponds to each NACK.

It can be learned that this implementation helps the second network device determine, for the corresponding terminal device, whether to perform retransmission and a retransmission policy used during retransmission.

Implementation 2.3.5: After obtaining a statistical result corresponding to each piece of HARQ timing information, the first network device further determines, based on fifth indication information, whether to send an identifier that is of a terminal device and that corresponds to each NACK in the statistical result.

The first network device may receive the fifth indication information from the second network device, where the fifth indication information indicates the first network device whether to send, to the second network device, the identifier that is of the terminal device and that is for each NACK corresponding to the HARQ timing information.

In this way, if the fifth indication information indicates the first network device to send, to the second network device, the identifier that is of the terminal device and that is for each NACK corresponding to the HARQ timing information, the first network device may further send, to the second network device, the identifier that is of the terminal device and that is for each NACK in addition to a quantity of NACKs and/or a ratio of the NACKs corresponding to each piece of HARQ timing information. If the fifth indication information indicates the first network device not to send, to the second network device, the identifier that is of the terminal device and that is for each NACK corresponding to the HARQ timing information, the first network device may send, to the second network device, a quantity of NACKs and/or a ratio of the NACKs corresponding to each piece of HARQ timing information.

It can be learned that this implementation helps improve flexibility of sending the HARQ information by the first network device to the second network device.

In addition, in step S207, in the feedback information that corresponds to the second network device and that is received by the second network device from the first network device, for the HARQ information, the second network device may start a statistics window to receive HARQ information from one or more first network devices. For example, after sending the downlink service, the second network device may start the statistics window, and collect statistics on the HARQ information from the first network device in the statistics window.

To be specific, that the second network device receives, from the one or more first network devices, the feedback information corresponding to the second network device includes: The second network device starts a statistics window of duration L at time K, where the time K is time at which the second network device sends the downlink service or time after the time at which the second network device sends the downlink service. The second network device receives, in the statistics window, HARQ information corresponding to a downlink service from the one or more first network devices. Because interaction delays between different first network devices and the second network device are different, the statistics window is used in at least this embodiment, so that the second network device centrally receives HARQ information forwarded by a plurality of first network devices.

The duration L of the statistics window may be predefined by a protocol, may be determined by the second network device, or may be obtained from another network device. This is not limited in this embodiment of this application. The starting time K of the statistics window may be time for immediately starting the statistics window after the second network device completes sending of the downlink service. Alternatively, the starting time K of the statistics window is determined based on a transmission delay that exists before the downlink service arrives at the terminal device. For example, before the downlink service arrives at the terminal device, because the first network device does not receive the HARQ information of the downlink service, the second network device may start the statistics window at a time point whose interval from completion of sending of the downlink service is a period of time T. In other words, the start time K of the statistics window is time corresponding to duration T from completion of sending of the downlink service.

An embodiment of this application further provides a retransmission method. The retransmission method is used to resolve how a second network device determines a retransmission manner based on HARQ information after receiving the HARQ information from a first network device. For example, the second network device sends a multimedia broadcast multicast service, in other words, the HARQ information corresponds to the multimedia broadcast multicast service of the second network device.

In one manner, as described in the foregoing Implementation 2.3.1, HARQ information received by the second network device in a statistics window L is HARQ information sets that correspond to HARQ timing information and that are from all first network devices. The second network device further needs to combine a plurality of HARQ information sets of same HARQ timing information, to obtain a HARQ information set corresponding to each piece of HARQ timing information. Further, the second network device collects, for the HARQ information set corresponding to each piece of HARQ timing information, statistics on a quantity of NACKs and/or a ratio of the NACKs corresponding to each piece of HARQ timing information.

In another manner, as described in the foregoing Implementation 2.3.2, HARQ information received by the second network device in a statistics window L is quantities of NACKs and/or ratios of the NACKs that correspond to HARQ timing information and that are from all first network devices. The second network device further needs to combine the quantities of NACKs and/or the ratios of the NACKs that correspond to the HARQ timing information and that are from all the first network device, to obtain a quantity of NACKs and/or a ratio of the NACKs corresponding to each piece of HARQ timing information.

For Implementation 2.3.1 and Implementation 2.3.2, after obtaining the quantity of NACKs and/or the ratio of the NACKs corresponding to each piece of HARQ timing information, the second network device may determine, depending on whether the quantity of NACKs and/or the ratio of the NACKs corresponding to the HARQ timing information is not greater than a corresponding threshold, whether to retransmit the multimedia broadcast multicast service in a multicast broadcast manner or retransmit the multimedia broadcast multicast service in a unicast manner. For example, if the quantity of NACKs corresponding to the HARQ timing information is greater than a first threshold, the second network device retransmits the multimedia broadcast multicast service in the multicast broadcast manner; or if the quantity of NACKs corresponding to the HARQ timing information is not greater than a first threshold, the second network device retransmits the multimedia broadcast multicast service in the unicast manner.

In still another manner, as described in the foregoing Implementation 2.3.3, HARQ information received by the second network device in a statistics window L is quantities of NACKs and/or ratios of the NACKs that correspond to HARQ timing information and that are from all first network devices, and an identifier that is of a terminal device and that corresponds to each NACK.

For Implementation 2.3.3, the second network device obtains the quantity of NACKs and/or the ratio of the NACKs corresponding to each piece of HARQ timing information, and the identifier that is of the terminal device and that corresponds to each NACK. Therefore, the second network device may retransmit the multimedia broadcast multicast service in a unicast manner.

In yet another manner, as described in the foregoing Implementation 2.3.4 and Implementation 2.3.5, HARQ information received by the second network device in a statistics window L is quantities of NACKs and/or ratios of the NACKs that correspond to HARQ timing information and that are from all first network devices, and an identifier that is of a terminal device and that corresponds to each NACK; or quantities of NACKs and/or ratios of the NACKs that correspond to HARQ timing information and that are from all first network devices.

For Implementation 2.3.4 and Implementation 2.3.5, if the second network device can learn of a quantity of NACKs and/or a ratio of the NACKs corresponding to each piece of HARQ timing information and the identifier that is of the terminal device and that corresponds to each NACK, the second network device retransmits the corresponding multimedia broadcast multicast service in a unicast manner; if the second network device can learn of a quantity of NACKs and/or a ratio of the NACKs corresponding to each piece of HARQ timing information, the second network device retransmits the corresponding multimedia broadcast multicast service in a multicast broadcast manner.

It can be learned that, according to the retransmission method in this application, a multimedia broadcast multicast service corresponding to a same HARQ process identifier, a same HARQ timing indicator, or same absolute receive time n may be retransmitted in different retransmission manners based on a quantity of NACKs and/or a ratio of the NACKs. This improves retransmission flexibility and helps reduce retransmission overheads.

When the first network device needs to send the identifier that is of the terminal device and that corresponds to each NACK, in addition to an explicit carrying manner, the identifier that is of the terminal device and that corresponds to each NACK may alternatively be indicated in an implicit manner. For example, the first network device sends an RNTI that is of the terminal device and that corresponds to each NACK, so that the second network device determines, based on the RNTI, the identifier that is of the terminal device and that corresponds to each NACK.

In addition, the second network device may determine, based on factors such as location information of the terminal device, quality of a channel between the terminal device and the second network device, an available resource amount of the second network device, and a load, whether the first network device or the second network device retransmits, in a unicast manner, the multimedia broadcast multicast service corresponding to the HARQ timing information to the corresponding terminal device.

For example, if the second network device determines that the terminal device is at an edge location of coverage of the second network device, the second network device sends the corresponding multimedia broadcast multicast service to the first network device, and the first network device sends the multimedia broadcast multicast service to the corresponding terminal device in the unicast manner. It can be learned that this manner helps avoid a problem of excessive resource consumption caused because the second network device needs to perform retransmission for a plurality of times to ensure that the corresponding terminal device receives the service.

In some embodiments, if the first network device sends the corresponding multimedia broadcast multicast service, the second network device may send fourth indication information to the first network device, to indicate the first network device to send the corresponding multimedia broadcast multicast service to the corresponding terminal device. It can be learned that this implementation helps reduce resource overheads caused by data retransmission.

For example, in the communication system shown in FIG. 7, when the network device 202 sends a multimedia broadcast multicast service 1 corresponding to a HARQ process identifier 1, and the network device 201 determines to send the multimedia broadcast multicast service 1 to the corresponding terminal device 203 in a unicast manner, the network device 201 may send the fourth indication information to the network device 202, where the fourth indication information indicates that the network device 202 sends the multimedia broadcast multicast service 1 to the corresponding terminal device 203. Further, the network device

202 may send the multimedia broadcast multicast service 1 to the terminal device 203. In some embodiments, the fourth indication information may carry a service identifier of the multimedia broadcast multicast service 1 and an identifier of the terminal device 203.

The following briefly describes related implementations in Embodiment 2 that are similar to those in Embodiment 1. For details, refer to related descriptions in Embodiment 1.

In this embodiment of this application, a manner of carrying the second indication information may be similar to a manner of carrying the first indication information in Embodiment 1. The second indication information is included in configuration information of the second network device; the second indication information is included in scheduling information of the multimedia broadcast multicast service; the second indication information is included in a system information block SIB from the first network device; or the second indication information is included in radio access control RRC signaling from the first network device.

In this embodiment of this application, a specific indication manner of the second indication information may be similar to some embodiments of the first indication information in Embodiment 1, and a difference lies in that the two have different functions.

For example, some embodiments is similar to the foregoing Implementation 1.1.1. The second indication information includes a forwarding indication, where the forwarding indication indicates to send the feedback information corresponding to the second network device to the first network device.

Another implementation is similar to the foregoing Implementation 1.1.2. The second indication information includes a plurality of forwarding indications, one forwarding indication corresponds to one piece of feedback information corresponding to the multimedia broadcast multicast service, and the forwarding indication indicates to send the corresponding piece of feedback information to the first network device.

Some embodiments is similar to the foregoing Implementation 1.1.3. The second indication information occupies N bits, the N bits can indicate $2^N$ forwarding indications, and each forwarding indication corresponds to one or more pieces of feedback information. N is determined based on a quantity of forwarding indications that need to be indicated by the second indication information.

In this embodiment of this application, similar to Implementation 1.2, an indication granularity of the second indication information may include but is not limited to a terminal device or a service.

Some embodiments is similar to the foregoing Implementation 1.2.1, and an indication granularity of the second indication information is a terminal device for indication. The second indication information indicates to send the feedback information corresponding to the second network device to the first network device. It can be learned that this implementation is at a granularity of a terminal device. To be specific, the terminal device feeds back the feedback information of the second network device through forwarding, without considering a specific type of service in the multimedia broadcast multicast service.

Another implementation is similar to the foregoing Implementation 1.2.2. The second indication information further includes one or more service identifiers, and each service identifier corresponds to one service that is in the multimedia broadcast multicast service. The second indication information indicates to send feedback information corresponding to one or more services that are in the broadcast multicast service to the first network device.

In some embodiments, the second indication information further includes one or more service identifiers, and each service identifier corresponds to one downlink service delivered by the second network device. The second indication information indicates to send, to the first network device, feedback information corresponding to the service corresponding to each service identifier. In other words, in this embodiment of this application, the downlink service sent by the second network device may be a multimedia broadcast multicast service, another unicast service, or the like.

In the uplink feedback method 200 shown in FIG. 14, after receiving the second indication information, the terminal device may send second acknowledgment indication information to the first network device, where the second acknowledgment indication information indicates to acknowledge that the feedback information corresponding to the second network device is to be sent to the first network device. Alternatively, the second acknowledgment indication information indicates to acknowledge that the feedback information corresponding to the second network device is to be sent through forwarding by the first network device.

In some embodiments, the feedback information corresponds to the multimedia broadcast multicast service from the second network device. The second acknowledgment indication information includes one or more service identifiers, and each service identifier corresponds to one service that is in the multimedia broadcast multicast service; and the second acknowledgment indication information indicates to acknowledge that feedback information corresponding to one or more services that are in the broadcast multicast service is to be sent to the first network device. For details, refer to related content in the foregoing Embodiment 1.

In some embodiments, the second acknowledgment indication information is carried in a first media access control control element MAC CE, and the first MAC CE includes a preset logical identifier LCID value. For a related implementation of the first MAC CE, refer to related content in Implementation 1.3 in the foregoing Embodiment 1, and details are not described herein again.

Embodiment 2 describes related content and various possible implementations of the uplink feedback method 200. In addition, Embodiment 2 is described by using an example of a network structure of the communication system 200 shown in FIG. 7. In some embodiments, Embodiment 2 may be applied to a large tower+small tower interworking scenario shown in FIG. 8. In Embodiment 2, feedback information corresponding to the large tower, for example, the HARQ information and/or the CSI information of the multimedia broadcast multicast service, can be forwarded by the small tower to the large tower. Therefore, Embodiment 2 resolves a problem of limited uplink feedback performed by the terminal device to the large tower, and the small tower forwards the feedback information corresponding to the large tower, so that reliability of a downlink service sent by the large tower is improved, and flexibility of control by the network device is improved.

Figure 16:
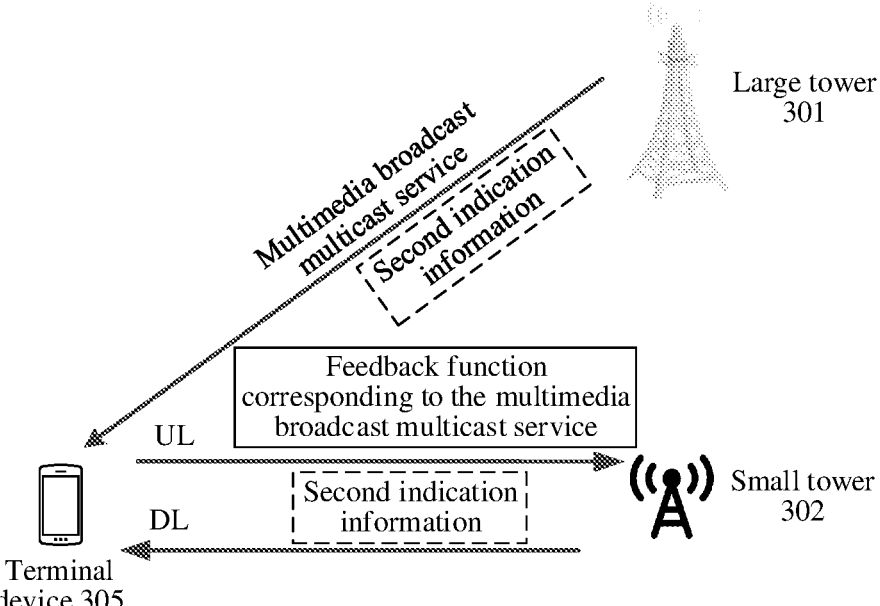
FIG. 16 is a schematic diagram of another uplink feedback method according to an embodiment of this application.

In addition, as shown in FIG. 16, in the large tower+small tower interworking scenario, when performing a unicast operation with a small tower 302, a terminal device 305 can further receive a multimedia broadcast multicast service from a large tower 301. The large tower 301 sends the multimedia broadcast multicast service, and the terminal device 305 sends feedback information corresponding to the multimedia broadcast multicast service to the small tower 302. It can be learned that in Embodiment 2, the feedback information of the multimedia broadcast multicast service sent by the large tower may be forwarded via the small tower, to improve reliability of transmission of the multimedia broadcast multicast service.

Embodiment 3: Uplink Feedback Method 300

This application further provides an uplink feedback method 300. A difference between the uplink feedback method 300 and the uplink feedback method 100 lies in that in the uplink feedback method 300, first indication information indicates to disable a feedback function corresponding to a second network device.

FIG. 17 is a schematic flowchart of an uplink feedback method 300 according to an embodiment of this application. As shown in FIG. 17, the uplink feedback method 300 includes but is not limited to the following steps.

S301: A network device determines first indication information, where the first indication information indicates to disable the feedback function corresponding to the second network device.

S302: The network device sends the first indication information.

S303: A terminal device receives the first indication information.

S304: The terminal device disables the feedback function corresponding to the second network device.

For related content of steps S301 to S304, refer to related descriptions of Embodiment 1. Details are not described herein again.

In some embodiments, in the uplink feedback method 300, after step S303, the terminal device may further send first acknowledgment indication information. Correspondingly, the network device may receive the first acknowledgment indication information. The first acknowledgment indication information indicates to acknowledge that the feedback function corresponding to the second network device is disabled or is to be disabled. In this case, the network device that transmits the first indication information may be a first network device, namely, a network device to which the terminal device can perform uplink feedback.

In some embodiments, the network device in steps S301 and S302 may be the first network device, or may be the second network device.

In some embodiments, the second network device may be a network device with large coverage. In the communication system 300 shown in FIG. 8, the large tower may be the second network device, and the large tower has a strong coverage capability, and can also cover a remote terminal device. However, because transmit power of the terminal device is limited, uplink coverage of the terminal device is limited. Therefore, although the terminal device can receive downlink data from the large tower, it is difficult for uplink data sent by the terminal device to reach the large tower. For example, it is difficult for HARQ information and channel state information (channel state information, CSI) sent by the terminal device to reach the large tower. In the uplink feedback method 300, a feedback function corresponding to the large tower is disabled, so that the large tower uses a more reliable transmission manner for a downlink service having a high reliability requirement. This helps improve reliability of the service transmitted by the large tower, and avoids a problem of limited uplink feedback performed by the terminal device. In addition, the uplink feedback method 300 also helps a network device side flexibly control transmission services of the large tower and a small tower based on a requirement.

For example, in the uplink feedback method shown in FIG. 17, the large tower may send the first indication information, where the first indication information indicates to disable the feedback function corresponding to the large tower, or the first indication information may be sent by the small tower.

Another related implementation of the uplink feedback method 300 is similar to some embodiments of the foregoing uplink feedback method 100, and a difference lies in that a function of the first indication information in the uplink feedback method 300 is different, or a function of the first acknowledgment indication information is different. Therefore, for a related implementation of the uplink feedback method 300, refer to related descriptions of the uplink feedback method 100. Details are not described herein again.

Embodiment 4: Uplink Feedback Method 400

This application further provides an uplink feedback method 400. In the uplink feedback method 400, a terminal device may receive third indication information, and the third indication information may be the first indication information in the uplink feedback method 100 or the second indication information in the uplink feedback method 200. This helps the terminal device determine, based on the third indication information, a processing manner of feedback information corresponding to a second network device. Correspondingly, a network device side may flexibly indicate, based on a reliability requirement of a multimedia broadcast multicast service, the processing manner of the feedback information corresponding to the second network device, to improve flexibility of control by a network device. In addition, the uplink feedback method 400 helps differentiate different service requirements, and flexibly configure an uplink feedback manner for response, so as to meet different requirements of the multimedia broadcast multicast service, and help improve resource utilization.

In some embodiments, in the uplink feedback method 400, the third indication information may include the first indication information and the second indication information, so that different processing manners are used for different feedback functions or feedback information, to further improve the flexibility of control by the network device.

In other words, the uplink feedback method 400 may be obtained by applying Embodiment 1 and Embodiment 2 to the communication system 200 shown in FIG. 7. In this way, the terminal device can use a manner of disabling a feedback function and transmitting feedback information through forwarding for different services. This helps resolve a problem of limited uplink feedback performed by the terminal device, and improves the flexibility of control on the network device side.

For example, in the uplink feedback method 400, the terminal device may receive the first indication information and the second indication information from a large tower 301. The first indication information indicates to disable a feedback function corresponding to the large tower, and the second indication information indicates to send feedback information corresponding to the large tower to a small tower. Alternatively, the first indication information indicates to disable a feedback function corresponding to the large tower, and the second indication information indicates to send a HARQ feedback corresponding to the large tower to a small tower. Alternatively, the first indication information indicates to disable a feedback function corresponding to the large tower, and the second indication information indicates to send a HARQ feedback corresponding to a multimedia broadcast multicast service 1 of the large tower to a small tower, where the multimedia broadcast multicast service 1 is sent by the large tower to the terminal device.

It can be learned that the uplink feedback method 400 resolves a problem of limited uplink feedback performed by the terminal device to the large tower. This helps improve reliability of a downlink service of the large tower, and improves the flexibility of control on the network device side.

Other related implementations of the uplink feedback method 400 are similar to the implementations of the uplink feedback method 100 and the uplink feedback method 200. A difference lies in that in the uplink feedback method 400, the first indication information and the second indication information are used together, or first acknowledgment indication information and second acknowledgment indication information are used together. Therefore, for related implementations of the uplink feedback method 400, refer to related descriptions of the uplink feedback method 100 and the uplink feedback method 200. Details are not described herein again. In some embodiments, related functions of the first indication information and the second indication information may be jointly indicated by using the third indication information, for example, indicated by using a same field or a same bit.

Figure 18:
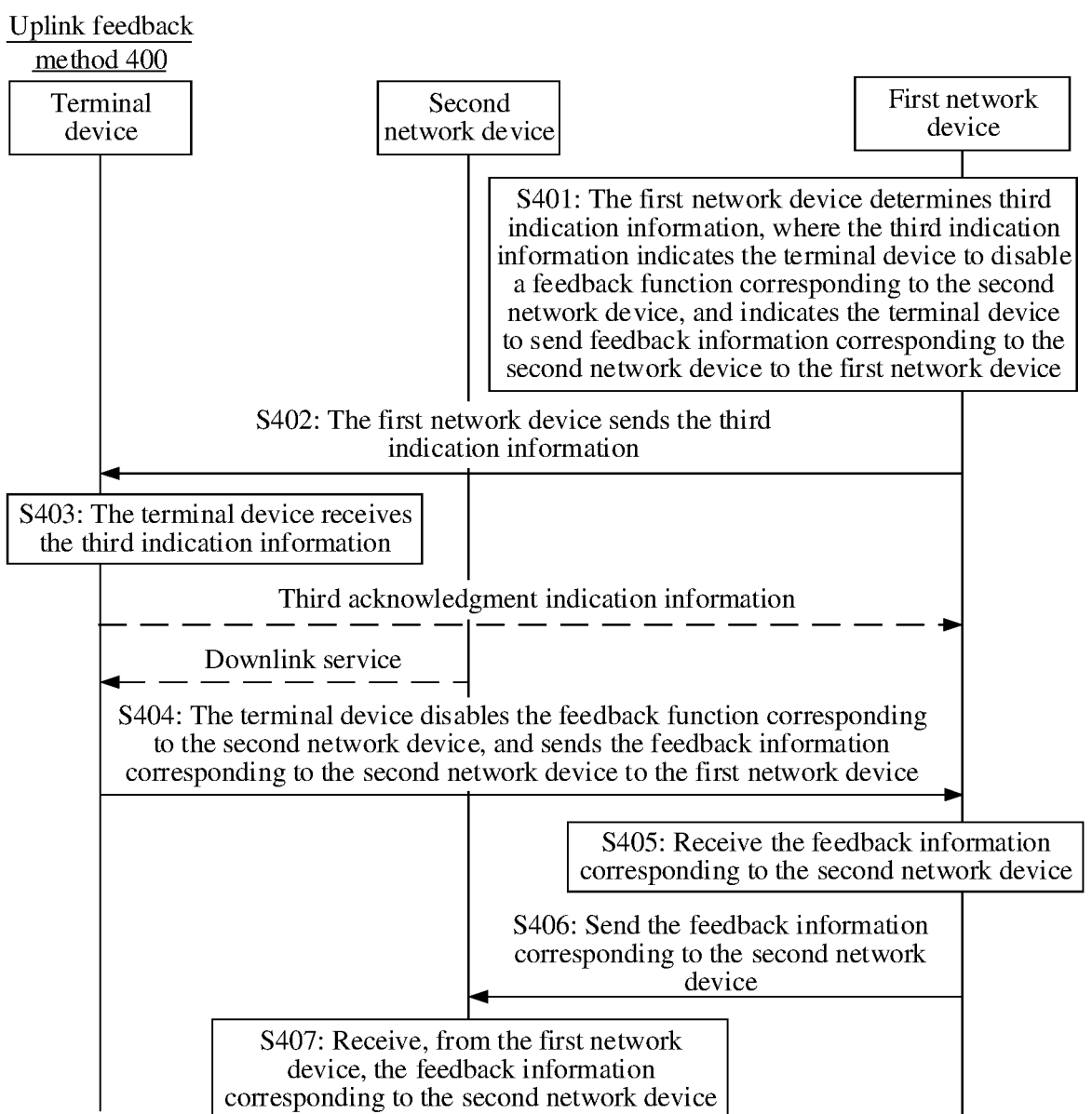
FIG. 18 is a schematic flowchart of an uplink feedback method 400 according to an embodiment of this application.

FIG. 18 is a schematic flowchart of an uplink feedback method 400 according to an embodiment of this application. The uplink feedback method 400 shown in FIG. 18 is described by using an example in which third indication information indicates a terminal device to disable a feedback function corresponding to a second network device and indicates the terminal device to send feedback information corresponding to the second network device to a first network device. Coverage of the second network device is greater than that of the first network device. As shown in FIG. 18, the uplink feedback method 400 includes but is not limited to the following steps.

S401: The first network device determines the third indication information, where the third indication information indicates the terminal device to disable the feedback function corresponding to the second network device, and indicates the terminal device to send the feedback information corresponding to the second network device to the first network device.

S402: The first network device sends the third indication information to the terminal device.

S403: The terminal device receives the third indication information.

S404: The terminal device disables the feedback function corresponding to the second network device, and sends the feedback information corresponding to the second network device to the first network device.

In some embodiments, before step S404, the second network device may send a downlink service, and the terminal device may receive the downlink service.

S405: The first network device receives the feedback information that corresponds to the second network device and that is from the terminal device.

S406: The first network device sends the feedback information corresponding to the second network device to the second network device.

S407: The second network device receives the feedback information corresponding to the second network device.

Descriptions of the third indication information are the same as those of the foregoing first indication information or second indication information, and may be from the first network device or the second network device. This is not limited in this embodiment of this application. In some embodiments, the first network device may interact with the second network device through an interface between the network devices, to determine the third indication information. Specifically, for related descriptions of steps S401 to S403, refer to Embodiment 1 or Embodiment 2. Details are not described herein again.

The downlink service sent by the second network device includes the multimedia broadcast multicast service, the downlink service, or the like described in the foregoing embodiments.

The feedback function corresponding to the second network device includes one or more of the following: a HARQ feedback function, a CSI feedback function, a CQI feedback function, a PMI feedback function, or an RI feedback function of an antenna matrix. The feedback information corresponding to the second network device includes one or more of the following: HARQ information, CSI, a CQI, a PMI, or an RI of an antenna matrix. The feedback function that corresponds to the second network device and that is indicated by the third indication information may be consistent with or inconsistent with the feedback information corresponding to the second network device. For example, the feedback function that corresponds to the second network device and that is indicated by the third indication information includes the HARQ feedback function and the CSI feedback function, and the feedback information that corresponds to the second network device and that is indicated by the third indication information includes the HARQ information. In this way, the terminal device may disable the HARQ feedback function and the CSI feedback function that correspond to the second network device, and the first network device forwards the HARQ information corresponding to the second network device to the second network device.

For an operation in which the first network device forwards the HARQ information corresponding to the second network device to the second network device in steps S405 to S407, refer to related descriptions in Embodiment 2, for example, related content in Implementation 2.2 and Implementation 2.3. Details are not described herein again.

It can be learned that, in the uplink feedback method 400 in FIG. 18, the feedback function corresponding to the second network device may be disabled, so as to resolve a problem of limited uplink feedback performed by the terminal device to the second network device, and the first network device may further forward the feedback information corresponding to the second network device, to improve reliability of transmitting the downlink service by the second network device. Therefore, the uplink feedback method 400 shown in FIG. 18 improves flexibility of control on a network device side.

In the foregoing embodiments, the descriptions of each embodiment have respective focuses. To avoid redundancy, for a part that is not described in detail in an embodiment, refer to related descriptions in other embodiments.

To implement functions of any one of the uplink feedback method 100 to the uplink feedback method 400 provided in embodiments of this application, a network device and a terminal device may separately include a hardware structure and a software module, and implement the foregoing functions in a form of the hardware structure, the software module, or a combination of the hardware structure and the software module. One of the foregoing functions may be performed by using the hardware structure, the software module, or the combination of the hardware structure and the software module.

Figure 19:
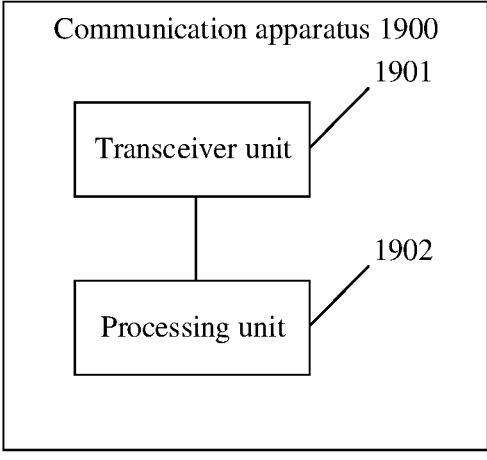
FIG. 19 is a schematic diagram of a structure of a communication apparatus 1900 according to an embodiment of this application.

FIG. 19 is a schematic diagram of a structure of a communication apparatus according to an embodiment of this application. The communication apparatus 1900 in FIG. 19 may include a transceiver unit 1901 and a processing unit 1902. The transceiver unit 1901 may include a sending unit and a receiving unit. The sending unit is configured to implement a sending function, and the receiving unit is configured to implement a receiving function, so that the transceiver unit 1901 may implement the sending function and/or the receiving function. A communication unit may also be described as a transceiver unit.

The communication apparatus 1900 may be a terminal device, an apparatus in the terminal device, or an apparatus that can be used together with the terminal device.

In some embodiments, the communication apparatus 1900 may implement related operations of the terminal device in the foregoing Embodiment 1, and includes the transceiver unit 1901 and the processing unit 1902.

The transceiver unit 1901 is configured to receive first indication information, where the first indication information indicates to disable a feedback function corresponding to a multimedia broadcast multicast service.

The processing unit 1902 is configured to disable the feedback function corresponding to the multimedia broadcast multicast service.

For related content of this implementation, refer to related content of the foregoing method embodiments. In addition, the communication apparatus 1900 may further perform related operations in other embodiments, and details are not described herein again.

The communication apparatus 1900 may be a network device, an apparatus in the network device, or an apparatus that can be used together with the network device.

In some embodiments, the communication apparatus 1900 may perform related operations of the network device in Embodiment 1, and the communication apparatus 1900 includes the transceiver unit 1901 and the processing unit 1902.

The processing unit 1902 is configured to determine first indication information, where the first indication information indicates to disable a feedback function corresponding to a multimedia broadcast multicast service.

The transceiver unit 1901 is configured to send the first indication information.

For related content of this implementation, refer to related content of the foregoing method embodiments. In addition, the communication apparatus 1900 may further perform related operations in other embodiments, and details are not described herein again.

Figure 20:
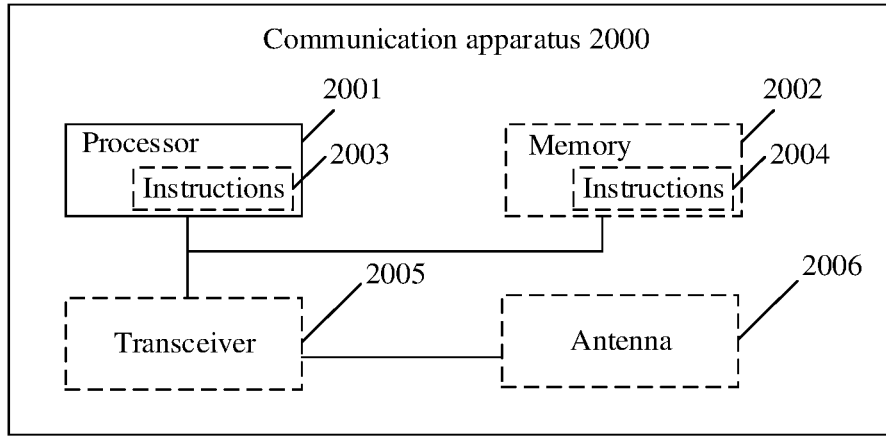
FIG. 20 is a schematic diagram of a structure of a communication apparatus 2000 according to an embodiment of this application.

FIG. 20 is a schematic diagram of a structure of another communication apparatus according to an embodiment of this application. The communication apparatus 2000 may be a network device, may be a terminal device, may be a chip, a chip system, a processor, or the like that supports the network device in implementing the foregoing methods, or may be a chip, a chip system, a processor, or the like that supports the terminal device in implementing the foregoing methods. The apparatus may be configured to implement the methods described in the foregoing method embodiments. For details, refer to the descriptions in the foregoing method embodiments.

The communication apparatus 2000 may include one or more processors 2001. The processor 2001 may be a general-purpose processor or a dedicated processor. For example, the processor 2001 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In some embodiments, the communication apparatus 2000 may include one or more memories 2002, and the memory 2002 may store instructions 2004. The instructions may be run on the processor 2001, so that the communication apparatus 2000 performs the methods described in the foregoing method embodiments. In some embodiments, the memory 2002 may further store data. The processor 2001 and the memory 2002 may be separately disposed, or may be integrated together.

In some embodiments, the communication apparatus 2000 may further include a transceiver 2005 and an antenna 2006. The transceiver 2005 may be referred to as a transceiver unit, a transceiver, a transceiver circuit, or the like, and is configured to implement a transceiver function. The transceiver 2005 may include a receiver and a transmitter. The receiver may be referred to as a receiving machine, a receiver circuit, or the like, and is configured to implement a receiving function. The transmitter may be referred to as a transmitting machine, a transmitter circuit, or the like, and is configured to implement a sending function.

When the communication apparatus 2000 is a terminal device, the transceiver 2005 is configured to perform S103 in FIG. 9, S203 and S204 in FIG. 14, S303 in FIG. 17, or S403 and S404 in FIG. 18; and the processor 2001 is configured to: perform S104 in FIG. 9, determine feedback information corresponding to a second network device in FIG. 14, S304 in FIG. 17, or perform a disabling operation and determine feedback information corresponding to a second network device in S404 in FIG. 18.

When the communication apparatus 2000 is a first network device, the transceiver 2005 is configured to perform S102 in FIG. 9, S202, S205, and S206 in FIG. 14, S302 in FIG. 17, or S402, S405, and S406 in FIG. 18; and the processor 2001 is configured to perform S101 in FIG. 9, S201 in FIG. 14, S301 in FIG. 17, or S401 in FIG. 18.

When the communication apparatus 2000 is a second network device, the transceiver 2005 is configured to perform S207 in FIG. 14 or S407 in FIG. 18.

In some embodiments, the communication apparatus 2000 is the second network device. The processor 2001 is configured to perform a related operation of determining the first indication information, the second indication information, or the third indication information. Correspondingly, the transceiver 2005 is configured to perform a related operation of sending the first indication information, the second indication information, or the third indication information.

In another possible design, the processor 2001 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, In some embodiments, the processor 2001 may store instructions 2003. When the instructions 2003 are executed on the processor 2001, the communication apparatus 2000 is enabled to perform the methods described in the foregoing method embodiments. The instructions 2003 may be fixed in the processor 2001. In this case, the processor 2001 may be implemented by hardware.

In yet another possible design, the communication apparatus 2000 may include a circuit. The circuit may implement a sending, receiving, or communication function in the foregoing method embodiments. The processor and the transceiver that are described in this application may be implemented on an integrated circuit (integrated circuit, IC), an analog IC, a radio frequency integrated circuit RFIC, a mixed-signal IC, an application-specific integrated circuit (application-specific integrated circuit, ASIC), a printed circuit board (printed circuit board, PCB), an electronic device, or the like. The processor and the transceiver may alternatively be manufactured by using various IC technologies, for example, a complementary metal oxide semiconductor (complementary metal oxide semiconductor, CMOS), an n-type metal oxide semiconductor (nMetal-oxide-semiconductor, NMOS), a p-channel metal oxide semiconductor (positive channel metal oxide semiconductor, PMOS), a bipolar junction transistor (bipolar junction transistor, BJT), a bipolar CMOS (BiCMOS), silicon germanium (SiGe), and gallium arsenide (GaAs).

The communication apparatus described in the foregoing embodiments may be a network device or a terminal device. However, a scope of the communication apparatus described in this application is not limited thereto, and a structure of the communication apparatus may not be limited by FIG. 20. The communication apparatus may be an independent device or may be a part of a large device. For example, the communication apparatus may be:

(1) an independent integrated circuit IC, a chip, or a chip system or subsystem;

(2) a set of one or more ICs, where In some embodiments, the IC set may also include a storage component configured to store data and instructions;

(3) an ASIC such as a modem (Modem);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) others.

This application further provides a computer-readable storage medium storing a computer program. When the computer-readable storage medium is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented through software, hardware, firmware, or any combination thereof. When software is used to implement embodiments, all or a part of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

The correspondences shown in the table in this application may be configured, or may be predefined. Values of the information in the table are merely examples, and other values may be configured. This is not limited in this application. When a correspondence between the information and the parameters is configured, not all the correspondences shown in the table need to be configured. For example, in the table in this application, correspondences shown in some rows may alternatively not be configured. For another example, proper deformations and adjustments such as splitting and combination may be performed based on the foregoing table. Names of the parameters shown in titles of the foregoing table may alternatively be other names that can be understood by a communication apparatus, and values or representation manners of the parameters may alternatively be other values or representation manners that can be understood by the communication apparatus. During implementation of the foregoing table, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

receiving, by a terminal device, first indication information, wherein the first indication information is useable to indicate to the terminal device to disable a feedback function corresponding to a multimedia broadcast multicast service;

disabling, by the terminal device, the feedback function corresponding to the multimedia broadcast multicast service; and sending, by the terminal device, first acknowledgment indication information, wherein the first acknowledgment indication information is useable to acknowledge that the feedback function corresponding to the multimedia broadcast multicast service is disabled or is to be disabled.

2. The method according to claim 1, further comprising:

receiving, by the terminal device, the multimedia broadcast multicast service from a second network device in response to the terminal device communicating with a first network device.

3. The method according to claim 1, wherein the first indication information is from a first network device or a second network device.

4. The method according to claim 1, wherein the first indication information is comprised in configuration information of a second network device;

the first indication information is comprised in scheduling information of the multimedia broadcast multicast service;

the first indication information is comprised in a system information block (SIB) from a first network device; or the first indication information is comprised in radio access control (RRC) signaling from the first network device.

5. A communication method, comprising:

determining, by a first network device or a second network device, first indication information, wherein the first indication information is useable to indicate to disable a feedback function corresponding to a multimedia broadcast multicast service;

sending, by the first network device or the second network device, the first indication information; and receiving, by the first network device or the second network device, first acknowledgment indication information, wherein the first acknowledgment indication information is useable to acknowledge that the feedback function corresponding to the multimedia broadcast multicast service is disabled or is to be disabled.

6. The method according to claim 5, further comprising:

sending, by the second network device, the multimedia broadcast multicast service in response to the first network device communicating with a terminal device.

7. The method according to claim 5, wherein the first indication information is comprised in configuration information of the second network device.

8. The method according to claim 5, wherein the first indication information is comprised in scheduling information of the multimedia broadcast multicast service;

the first indication information is comprised in a system information block (SIB) sent by the first network device; or the first indication information is comprised in radio access control (RRC) signaling sent by the first network device.

9. A communication apparatus, comprising:

at least one processor; and one or more memories coupled to the at least one processor, and configured to store non-transitory instructions, the at least one processor being configured to execute the non-transitory instructions thereby causing the apparatus to:

receive first indication information, wherein the first indication information is useable to indicate to the communication apparatus to disable a feedback function corresponding to a multimedia broadcast multicast service;

disable the feedback function corresponding to the multimedia broadcast multicast service; and send first acknowledgment indication information, wherein the first acknowledgment indication information is useable to acknowledge that the feedback function corresponding to the multimedia broadcast multicast service is disabled or is to be disabled.

10. The communication apparatus according to claim 9, wherein the at least one processor being configured to execute the non-transitory instructions thereby further causing the apparatus to:

receive the multimedia broadcast multicast service from a second network device in response to the communication apparatus communicating with a first network device.

11. The communication apparatus according to claim 9, wherein the first indication information is from a first network device or a second network device.

12. The communication apparatus according to claim 9, wherein the first indication information is comprised in configuration information of a second network device;

the first indication information is comprised in scheduling information of the multimedia broadcast multicast service;

the first indication information is comprised in a system information block (SIB) from a first network device; or the first indication information is comprised in radio access control (RRC) signaling from the first network device.

13. A communication apparatus, comprising:

at least one processor; and one or more memories coupled to the at least one processor, and configured to store non-transitory instructions, the at least one processor being configured to execute the non-transitory instructions thereby causing the apparatus to:

determine first indication information, wherein the first indication information is useable to indicate to disable a feedback function corresponding to a multimedia broadcast multicast service;

send the first indication information; and receive first acknowledgment indication information, wherein the first acknowledgment indication information is useable to acknowledge that the feedback function corresponding to the multimedia broadcast multicast service is disabled or is to be disabled, wherein the communication apparatus is a first network device, a second network device, a chip of the first network device, or a chip of the second network device.

14. The communication apparatus according to claim 13, wherein the at least one processor being configured to execute the non-transitory instructions thereby further causing the apparatus to:

send the multimedia broadcast multicast service in response to the first network device communicating with a terminal device.

15. The communication apparatus according to claim 13, wherein the first indication information is comprised in configuration information of the second network device.

16. The communication apparatus according to claim 13, wherein the first indication information is comprised in scheduling information of the multimedia broadcast multicast service;

the first indication information is comprised in a system information block (SIB) sent by the first network device; or the first indication information is comprised in radio access control (RRC) signaling sent by the first network device.

\* \* \* \* \*